US008649078B2

(12) United States Patent
Aimono et al.

(10) Patent No.: US 8,649,078 B2
(45) Date of Patent: Feb. 11, 2014

(54) DRIVER FOR OPTICAL DEFLECTOR USING COMPLEX-SINUSOIDAL-WAVE DRIVE VOLTAGES AND METHOD FOR SETTING THE SAME

(75) Inventors: Takanori Aimono, Tokyo (JP); Yoshiaki Yasuda, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 103 days.

(21) Appl. No.: 13/411,101

(22) Filed: Mar. 2, 2012

(65) Prior Publication Data

US 2012/0224240 A1 Sep. 6, 2012

(30) Foreign Application Priority Data

Mar. 4, 2011 (JP) ................................. 2011-048189

(51) Int. Cl.
G02B 26/08 (2006.01)

(52) U.S. Cl.
USPC .................. 359/199.4; 359/200.8; 359/224.1; 359/900

(58) Field of Classification Search
USPC .......... 359/197.1–199.4, 200.6–200.8, 221.2, 359/224.1–24.2; 310/311, 317
See application file for complete search history.

(56) References Cited

U.S. PATENT DOCUMENTS

| 2007/0064300 | A1  | 3/2007  | Barnes et al. |
| 2008/0239252 | A1  | 10/2008 | Konno et al. |
| 2009/0284816 | A1  | 11/2009 | Davis et al. |
| 2011/0032590 | A1* | 2/2011  | Terada et al. ............. 359/199.4 |

FOREIGN PATENT DOCUMENTS

JP 2009-223165 A 10/2009

OTHER PUBLICATIONS

Extended European Search Report (EESR) dated Jun. 19, 2012 (in English) in counterpart European Application No. 12001389.1.

* cited by examiner

*Primary Examiner* — James Phan
(74) *Attorney, Agent, or Firm* — Holtz, Holtz, Goodman & Chick, PC

(57) ABSTRACT

A driver for driving an optical deflector includes a mirror, a movable frame for supporting the mirror, a support body surrounding the movable frame, and a first group of piezoelectric actuators and a second group of piezoelectric actuators alternating with the first group of piezoelectric actuators. A first drive voltage for the first group of piezoelectric actuators has first repeated waves each with a first rising period. A second drive voltage for the second group of piezoelectric actuators has second repeated waves each with a second falling period corresponding to the first rising period of the first drive voltage and a second rising period corresponding to the first falling period of the first drive voltage. Frequencies of the first and second repeated waves exclude natural frequencies of a mechanically-vibrating system of the mirror with respect to the axis thereof depending upon the piezoelectric actuators.

7 Claims, 20 Drawing Sheets

PRIOR ART

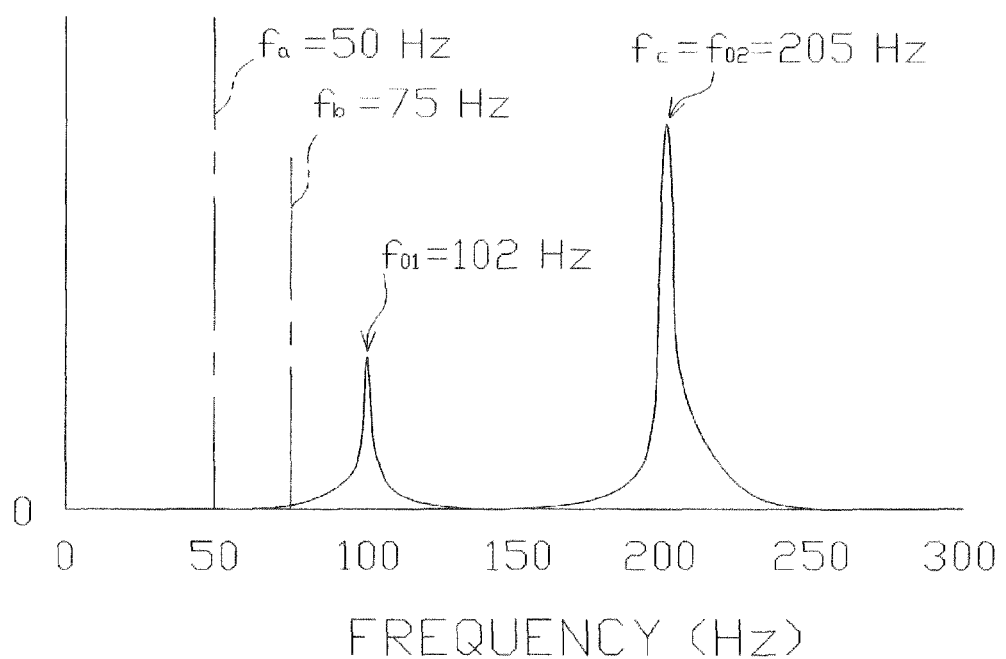

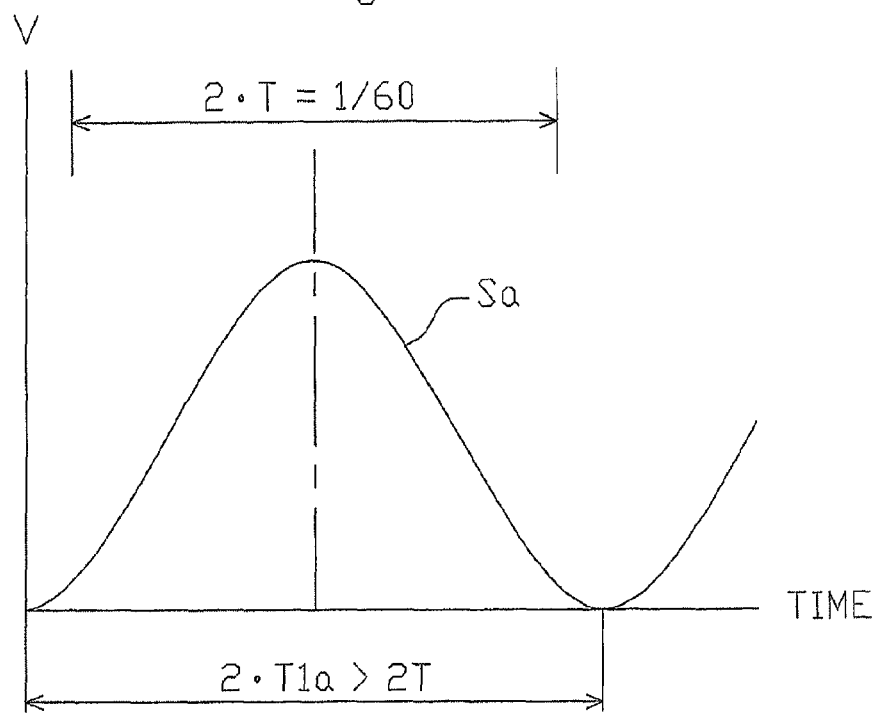
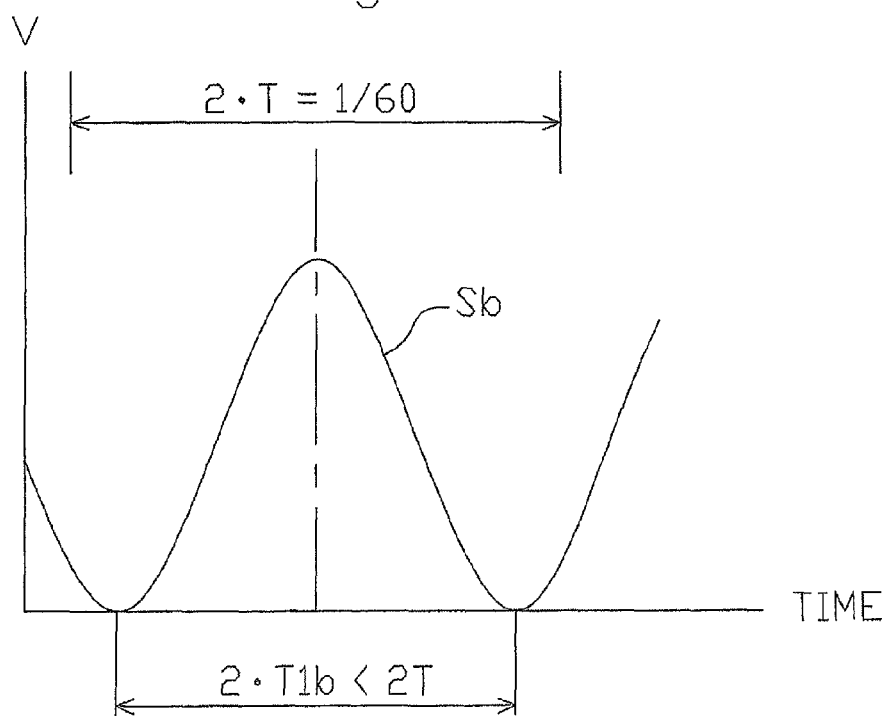

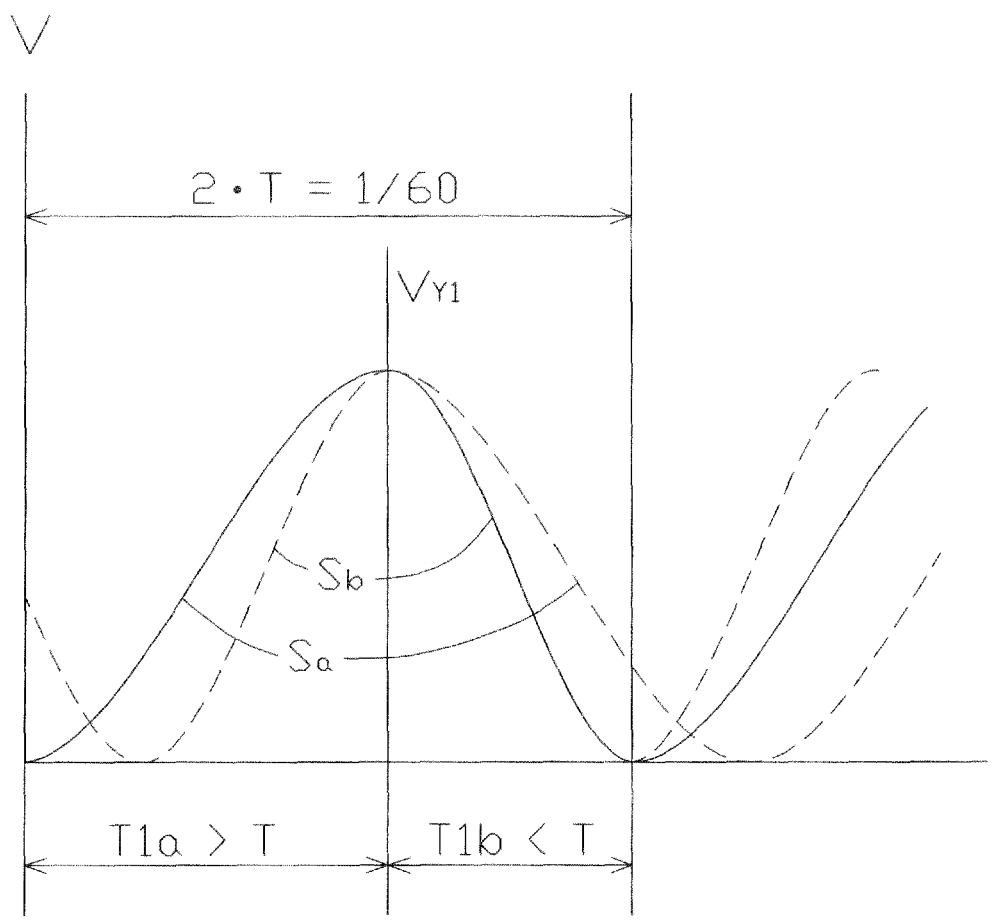

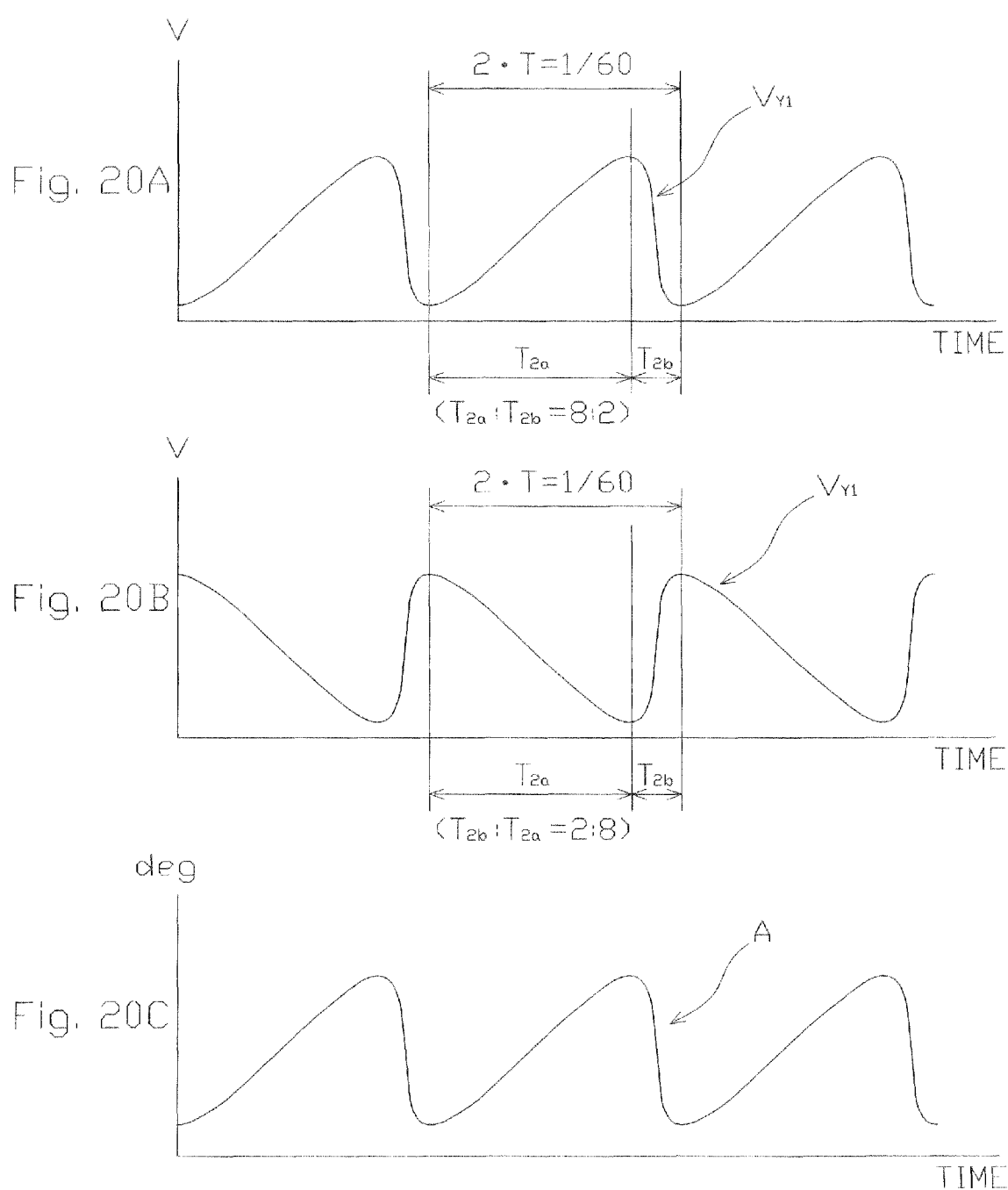

US 8,649,078 B2

DRIVER FOR OPTICAL DEFLECTOR USING COMPLEX-SINUSOIDAL-WAVE DRIVE VOLTAGES AND METHOD FOR SETTING THE SAME

This application claims the priority benefit under 35 U.S.C. §119 to Japanese Patent Application No. JP2011-048189 filed on Mar. 4, 2011, which disclosure is hereby incorporated in its entirety by reference.

BACKGROUND

1. Field

The presently disclosed subject matter relates to a driver for driving an optical deflector and a method for setting drive voltages therefor.

2. Description of the Related Art

A prior art two-dimensional optical deflector is constructed by a mirror; a movable frame surrounding the mirror for supporting the mirror through a pair of torsion bars; inner piezoelectric actuators fixed between the movable frame and the torsion bars and serving as cantilevers for rocking the mirror through the torsion bars with respect to an X-axis of the mirror; a support body surrounding the movable frame; and outer piezoelectric actuators fixed between the support body and the movable frame and serving as cantilevers for rocking the mirror through the movable frame with respect to a Y-axis of the mirror perpendicular to the X-axis (see: JP2009-223165A).

Generally, in an optical scanner, the mirror is rocked with respect to the X-axis for a horizontal deflection at a high frequency such as 15 kHz, while the mirror is rocked with respect to the Y-axis for a vertical deflection at a low frequency such as 60 Hz.

In the described prior art two-dimensional optical deflector, since the inner piezoelectric actuators rock the mirror through the torsion bars, the inner piezoelectric actuators are driven by synchronous sinusoidal-wave drive voltages.

On the other hand, since the outer piezoelectric actuators rock the mirror without torsion bars, the outer piezoelectric actuators are driven by synchronous saw-tooth drive voltages. In more detail, the outer piezoelectric actuators are folded at every actuator or jetting, and a first group of the outer piezoelectric actuators and a second group of the outer piezoelectric actuators alternating with the first group of the outer piezoelectric actuators are driven by two synchronous saw-tooth drive voltages, respectively.

However, when the first and second groups of the outer piezoelectric actuators are driven by such two synchronous saw-tooth drive voltages, the synchronous saw-tooth drive voltages include harmonic frequency components in addition to their fundamental frequency. Therefore, even when the fundamental frequency of the synchronous saw-tooth drive voltages is smaller than the natural frequencies of a mechanically-vibrating system of the mirror with respect to the Y-axis depending upon the structure of the outer piezoelectric actuators, one of the above-mentioned harmonic frequency components would coincide with one of the natural frequencies or be brought close to one of the natural frequencies. In this case, this harmonic frequency component of the drive voltages would resonate with such a natural frequency of the mechanically-vibrating system of the mirror with respect to the Y-axis, so that a higher frequency vibration would be superimposed onto the rocking of the mirror with respect to the Y-axis.

In order to avoid higher frequency vibration of the mirror, one approach is to make the natural frequencies much larger than the fundamental frequency of the synchronous saw-tooth drive voltages. In this case, however, since the mechanically-vibrating system of the mirror including the outer piezoelectric actuators is hardened, it would be difficult to rock the mirror at a larger deflection angle.

Another approach is to use synchronous sinusoidal-wave drive voltages whose frequency is much larger than the natural frequencies of the mechanically-vibrating system of the mirror with respect to the Y-axis, instead of the synchronous saw-tooth drive voltages. In this case, however, a linearly-deflected period within one period of the synchronous sinusoidal-wave drive voltages where the deflection angle is linearly changed becomes too small, i.e., an effective scanning period becomes too small, it is not practical in an image display apparatus such as a projector to use such an optical deflector.

SUMMARY

The presently disclosed subject matter seeks to solve one or more of the above-described problems.

According to the presently disclosed subject matter, in an optical deflector comprising a mirror, a movable frame for supporting the mirror, a support body surrounding the movable frame, and a first group of piezoelectric actuators serving as cantilevers and a second group of piezoelectric actuators serving as cantilevers alternating with the first group of piezoelectric actuators, the piezoelectric actuators are folded at every actuator and connected from the support body to the movable frame. Each piezoelectric actuator is in parallel with one axis of the mirror. A first drive voltage for the first group of piezoelectric actuators having first repeated waves each with a first rising period and a first falling period is generated. One of the first rising period and the first falling period is larger than the other. A second drive voltage for the second group of piezoelectric actuators having second repeated waves each with a second falling period corresponding to the first rising period of the first drive voltage and a second rising period corresponding to the first falling period of the first drive voltage is generated. Frequencies of the first and second repeated waves exclude natural frequencies of a mechanically-vibrating system of the mirror with respect to the axis thereof depending upon the piezoelectric actuators.

According to the presently disclosed subject matter, since the first rising period of the first drive voltage and the second falling period of the second drive voltage are larger than the first falling period of the first drive voltage and the second rising period of the second drive voltage, the deflection angle can be linearly changed for a longer period, so that the optical deflector according to the presently disclosed subject matter can be applied to an image display apparatus such as a projector. Also, the resonation of the harmonic frequency components of the first and second drive voltages with the natural frequency components of the mechanically-vibrating system of the mirror can be suppressed.

Also, in a method for setting drive data for driving an optical deflector comprising: a mirror; a movable frame for supporting the mirror; a support body surrounding the movable frame; and a first group of piezoelectric actuators serving as cantilevers and a second group of piezoelectric actuators serving as cantilevers alternating with the first group of piezoelectric actuators, the piezoelectric actuators being folded at every actuator and connected from the support body to the movable frame, each of the piezoelectric actuators being in parallel with one axis of the mirror, a period is set common to first and second drive voltages for the first and second groups of piezoelectric actuators, respectively. Then, first and second half periods are selected. In this case, a total of the first and second half periods is the same as the set period thereby to select first and second sinusoidal-waves having the first and second half periods, respectively. Then, it is determined whether or not the frequencies of the first and second sinusoidal-waves are around natural frequencies of a mechanically-vibrating system of the mirror with respect to the Y-axis depending upon a structure of the piezoelectric actuators. Then, when the frequencies of the first and second sinusoidal-waves are not around the natural frequencies, the first sinusoidal-wave is combined with the second sinusoidal-wave thereby to set first drive data for the first group of piezoelectric actuators in such a way that an end point of a rising period of the first sinusoidal-wave coincides with a start point of a falling period of the second sinusoidal-wave and an end point of the falling period of the second sinusoidal-wave coincides with a start point of the rising period of the first sinusoidal-wave. Finally, the first drive data is inverted into second drive data for the second group of piezoelectric actuators.

Further, in a method for setting drive data for driving an optical deflector comprising: a mirror; a movable frame for supporting the mirror; a support body surrounding the movable frame; and a first group of piezoelectric actuators serving as cantilevers and a second group of piezoelectric actuators serving as cantilevers alternating with the first group of piezoelectric actuators, the piezoelectric actuators being folded at every actuator and connected from the support body to the movable frame, each of the piezoelectric actuators being in parallel with one axis of the mirror, a period is set common to first and second drive voltages for the first and second groups of piezoelectric actuators, respectively. Then, a rising period and a falling period are designated. In this case, a total of the rising period and the falling period is the same as the set period thereby to select a saw-tooth wave data having a total period equal to the rising period and the falling period. Then, a Fourier transform is performed upon the saw-tooth wave data to obtain a frequency spectrum. Then, harmonic frequency components of the frequency spectrum around natural frequencies of a mechanically-vibrating system of the mirror depending upon the piezoelectric actuators are removed or attenuated. Then, an inverse-Fourier transform is performed upon the frequency spectrum to obtain a first drive data for the first group of piezoelectric actuators. Finally, the first drive data is inverted into second drive data for the second group of piezoelectric actuators.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 6 is a frequency spectrum diagram of the mechanically-vibrating system of the mirror of FIG. 1 calculated at step 502 of FIG. 5;

FIGS. 7A and 7B are timing diagrams of the sinusoidal-wave voltages selected at step 503 of FIG. 5;

FIG. 8 is a timing diagram of the drive voltage $V_{Y1}$ obtained at step 505 of FIG. 5;

FIGS. 20A, 20B and 20C are timing diagrams of the drive voltages $V_{Y1}$ and $V_{Y2}$ and the deflection angle A in the flowchart of FIG. 19.

DETAILED DESCRIPTION OF EXEMPLARY EMBODIMENTS

Figure 1:
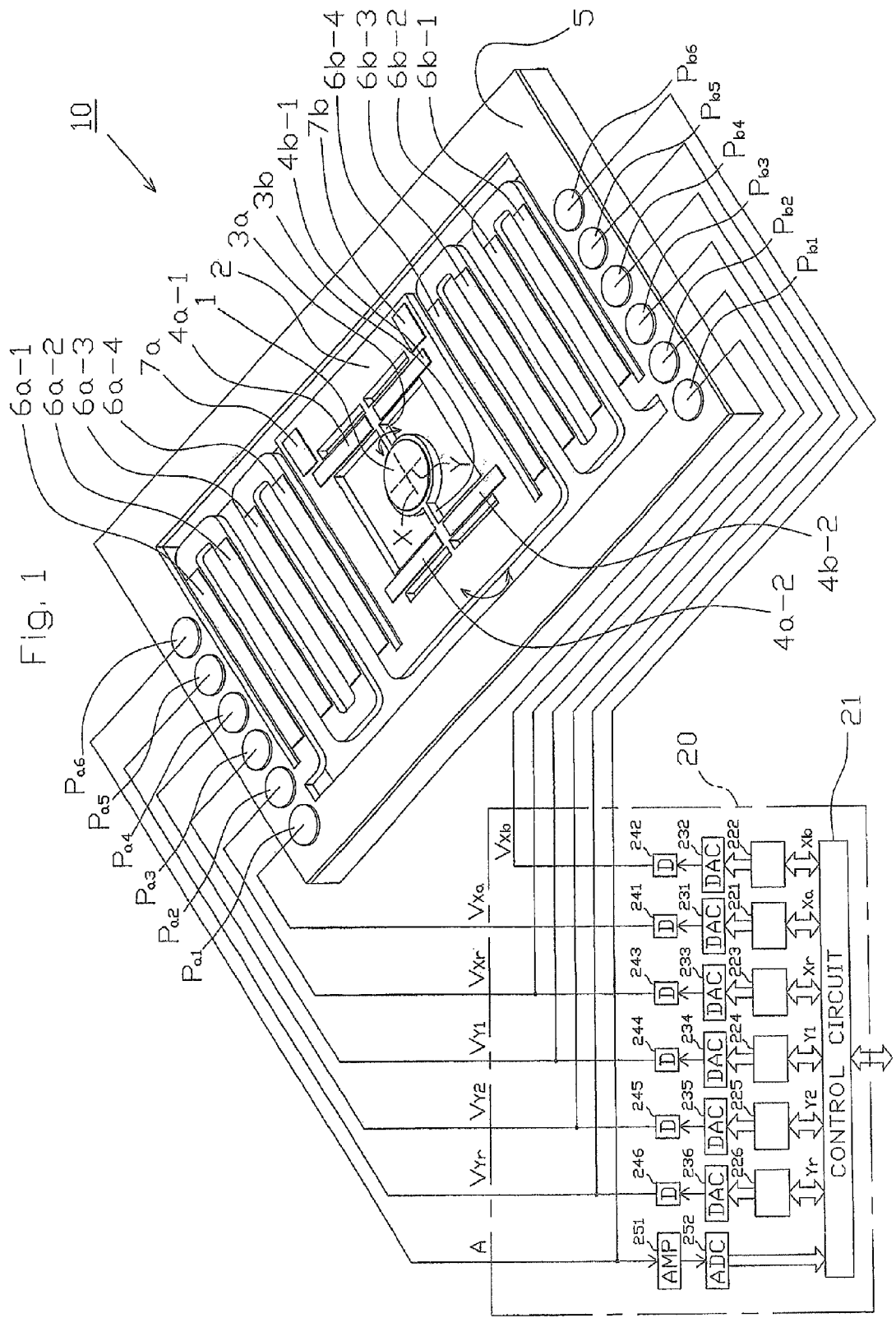
FIG. 1 is a view illustrating an embodiment of the driver for driving an optical deflector according to the presently disclosed subject matter.

In FIG. 1, which illustrates an embodiment of the driver for driving an optical deflector according to the presently disclosed subject matter, an optical deflector 10 and its driver 20 are provided.

The optical deflector 10 is constructed by a circular mirror 1 for reflecting an incident light, a movable frame 2 surrounding the mirror 1 for supporting the mirror 1 through a pair of torsion bars 3a and 3b, inner piezoelectric actuators 4a-1, 4a-2, 4b-1 and 4b-2 fixed between the movable frame 2 and the torsion bars 3a and 3b and serving as cantilevers for rocking the mirror 1 through the torsion bars 3a and 3b with respect to an X-axis of the mirror 1, a support body 5 surrounding the movable frame 2, outer piezoelectric actuators 6a-1, 6a-2, 6a-3 and 6a-4 and 6b-1, 6b-2, 6b-3 and 6b-4 fixed between the support body 5 and the movable frame 2 and serving as cantilevers for rocking the mirror 1 through the movable frame 2 with respect to a Y-axis of the mirror 1 perpendicular to the X-axis, and piezoelectric sensors 7a and 7b on the movable frame 2.

The torsion bars 3a and 3b are arranged along the X-axis, and have ends coupled to the inner circumference of the movable frame 2 and other ends coupled to the outer circumference of the mirror 1. Therefore, the torsion bars 3a and 3b are twisted by the inner piezoelectric actuators 4a-1, 4a-2, 4b-1 and 4b-2 to rock the mirror 1 with respect to the X-axis.

The inner piezoelectric actuators 4a-1 and 4b-1 oppose each other along the Y-axis and sandwich the torsion bar 3a. The inner piezoelectric actuators 4a-1 and 4b-1 have ends coupled to the inner circumference of the movable frame 2 and other ends coupled to the torsion bar 3a. In this case, the flexing direction of the inner piezoelectric actuator 4a-1 is opposite to that of the inner piezoelectric actuator 4b-1.

Similarly, the inner piezoelectric actuators 4a-2 and 4b-2 oppose each other along the Y-axis and sandwich the torsion bars 3b. The inner piezoelectric actuators 4a-2 and 4b-2 have ends coupled to the inner circumference of the movable frame 2 and other ends coupled to the torsion bar 3b. In this case, the flexing direction of the inner piezoelectric actuator 4a-2 is opposite to that of the inner piezoelectric actuator 4b-2.

The support body 5 is rectangularly-framed to surround the movable frame 2.

The outer piezoelectric actuators 6a-1, 6a-2, 6a-3 and 6a-4, 6b-1, 6b-2, 6b-3 and 6b-4 are coupled between the inner circumference of the support body 5 and the outer circumference of the movable frame 2, in order to rock the movable frame 2 associated with the mirror 1 with respect to the support body 5, i.e., to rock the mirror 1 with respect to the Y-axis.

The outer piezoelectric actuators 6a-1, 6a-2, 6a-3 and 6a-4 are serially-coupled from the support body 5 to the movable frame 2. Also, each of the outer piezoelectric actuators 6a-1, 6a-2, 6a-3 and 6a-4 are in parallel with the X-axis of the mirror 1. Therefore, the outer piezoelectric actuators 6a-1, 6a-2, 6a-3 and 6a-4 are folded at every actuator or setting from the support body 5 to the movable frame 2, so that the amplitudes of the outer piezoelectric actuators 6a-1, 6a-2, 6a-3 and 6a-4 can be changed along directions perpendicular to the Y-axis of the mirror 1.

Similarly, the outer piezoelectric actuators 6b-1, 6b-2, 6b-3 and 6b-4 are serially-coupled from the support body 5 to the movable frame 2. Also, each of the outer piezoelectric actuators 6b-1, 6b-2, 6b-3 and 6b-4 are in parallel with the X-axis of the mirror 1. Therefore, the outer piezoelectric actuators 6b-1, 6b-2, 6b-3 and 6b-4 are folded at every actuator or setting from the support body 5 to the movable frame 2, so that the amplitudes of the outer piezoelectric actuators 6b-1, 6b-2, 6b-3 and 6b-4 can be changed along directions perpendicular to the Y-axis of the mirror 1.

The piezoelectric sensors 7a and 7b sense a deflection angle A of the mirror 1 with respect to the Y-axis.

Provided on the optical deflector 10 are pads $P_{a1}$, $P_{a2}$, $P_{a3}$, $P_{a4}$, $P_{a5}$ and $P_{a6}$, $P_{b1}$, $P_{b2}$, $P_{b3}$, $P_{b4}$, $P_{b5}$ and $P_{b6}$ which are connected to the driver 20.

Figure 2:
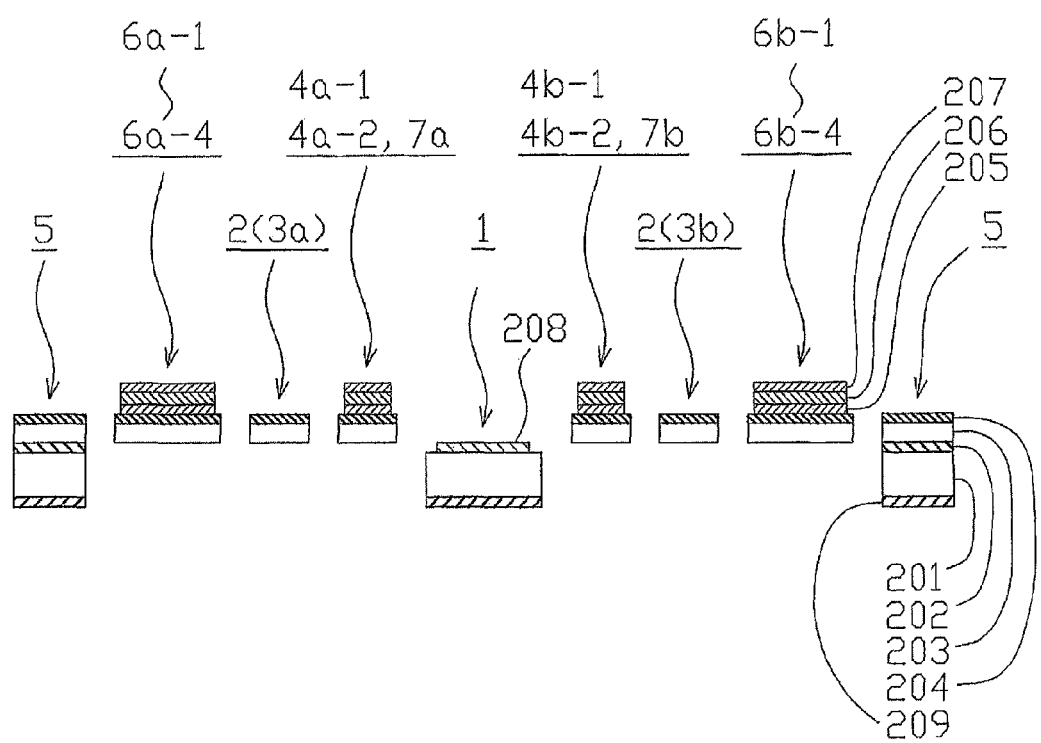
FIG. 2 is a cross-sectional view of the optical deflector of FIG. 1.

The pad $P_{a1}$ is connected to the upper electrode layer 207 (see: FIG. 2) of each of the inner piezoelectric actuators 4a-1 and 4a-2, and the pad $P_{a2}$ is connected to the lower electrode layer 205 (see: FIG. 2) of each of the inner piezoelectric actuators 4a-1 and 4a-2. Also, the pad $P_{a3}$ is connected to the upper electrode layer 207 (see: FIG. 2) of each of the outer piezoelectric actuators 6a-1 and 6a-3, and the pad $P_{a4}$ is connected to the upper electrode layer 207 (see: FIG. 2) of each of the outer piezoelectric actuators 6a-2 and 6a-4. Further, the pad $P_{a5}$ is connected to the lower electrode layer 205 (see: FIG. 2) of each of the outer piezoelectric actuators 6a-1, 6a-2, 6a-3 and 6a-4 and the lower electrode layer 205 (see: FIG. 2) of the piezoelectric sensor 7a. Still further, the pad $P_{a6}$ is connected to the upper electrode layer 207 (see: FIG. 2) of the piezoelectric sensor 7a.

On the other hand, the pad $P_{b1}$ is connected to the upper electrode layer 207 (see: FIG. 2) of each of the inner piezoelectric actuators 4b-1 and 4b-2, and the pad $P_{b2}$ is connected to the lower electrode layer 205 (see: FIG. 2) of each of the inner piezoelectric actuators 4b-1 and 4b-2. Also, the pad $P_{b3}$ is connected to the upper electrode layer 207 (see: FIG. 2) of each of the outer piezoelectric actuators 6b-1 and 6b-3, and the pad $P_{b4}$ is connected to the upper electrode layer 207 (see: FIG. 2) of each of the outer piezoelectric actuators 6b-2 and 6b-4. Further, the pad $P_{b5}$ is connected to the lower electrode layer 205 (see: FIG. 2) of each of the outer piezoelectric actuators 6b-1, 6b-2, 6b-3 and 6b-4 and the lower electrode layer 205 (see: FIG. 2) of the piezoelectric sensor 7b. Still further, the pad $P_{b6}$ is connected to the upper electrode layer 207 of the piezoelectric sensor 7b.

The driver 20 is constructed by a control circuit 21 such as a microcomputer including a central processing unit (CPU), a read-only memory (ROM), a random access memory (RAM), an input/output (I/O) interface and the like.

The driver 20 further includes a nonvolatile memory 221 for storing drive data Xa for driving the upper electrode layers of the inner piezoelectric actuators 4a-1 and 4a-2, a digital-to-analog converter (DAC) 231 for converting the drive data Xa into a drive voltage $V_{Xa}$, and a drive circuit 241 for applying the drive voltage $V_{Xa}$ to the pad $P_{a1}$.

The driver 20 further includes a nonvolatile memory 222 for storing drive data Xb for driving the upper electrode layers of the inner piezoelectric actuators 4b-1 and 4b-2, a digital-to-analog converter (DAC) 232 for converting the drive data Xb into a drive voltage $V_{Xb}$, and a drive circuit 242 for applying the drive voltage $V_{Xb}$ to the pad $P_{b1}$.

The driver 20 further includes a nonvolatile memory 223 for storing reference data Xr for driving the lower electrode layers of the inner piezoelectric actuators 4a-1, 4a-2, 4b-1 and 4b-2, a digital-to-analog converter (DAC) 233 for converting the reference data Xr into a reference voltage $V_{Xr}$, and a drive circuit 243 for applying the reference voltage $V_{Xr}$ to the pads $P_{a2}$ and $P_{b2}$.

The driver 20 further includes a nonvolatile memory 224 for storing drive data Y1 for driving the upper electrode layers of the outer piezoelectric actuators 6a-1, 6a-3, 6b-1 and 6b-3, a digital-to-analog converter (DAC) 234 for converting the drive data Y1 into a drive voltage $V_{Y1}$, and a drive circuit 244 for applying the drive voltage $V_{Y1}$ to the pads $P_{a3}$ and $P_{b3}$.

The driver 20 further includes a nonvolatile memory 225 for storing drive data Y2 for driving the upper electrode layers of the outer piezoelectric actuators 6a-2, 6a-4, 6b-2 and 6b-4, a digital-to-analog converter (DAC) 235 for converting the drive data Y2 into a drive voltage $V_{Y2}$, and a drive circuit 245 for applying the drive voltage $V_{Y2}$ to the pads $P_{a4}$ and $P_{b4}$.

The driver 20 further includes a nonvolatile memory 226 for storing reference data Yr for driving the lower electrode layers of the outer piezoelectric actuators 6a-1, 6a-2, 6a-3, 6a-4, 6b-1, 6b-2, 6b-3 and 6b-4, a digital-to-analog converter (DAC) 236 for converting the reference data Yr into a reference voltage $V_{Yr}$, and a drive circuit 246 for applying the reference voltage $V_{Yr}$ to the pads $P_{a5}$ and $P_{b5}$.

The driver 20 further includes an amplifier 251 for amplifying an analog deflection angle A of the mirror 1 from the pads $P_{a6}$ and $P_{b6}$ and an analog-to-digital converter (ADC) 252 for converting the analog deflection angle A into a digital deflection angle data.

Note that the number of the outer piezoelectric actuators 6a-1, 6a-2, 6a-3 and 6a-4 and the number of the outer piezoelectric actuators 6b-1, 6b-2, 6b-3 and 6b-4 can be other values such as 2, 6, 8, . . . .

The structure of each element of the optical deflector 10 is explained next with reference to FIG. 2.

In FIG. 2, a monocrystalline silicon support layer 201, an intermediate silicon oxide layer 202 and a monocrystalline silicon active layer 203 are formed by a silicon-on-insulator (SOI) substrate. Also, reference numeral 204 designates a silicon oxide layer, 205 designates a lower electrode layer made of Pt, Au or the like, 206 designates a lead titanate zirconate (PZT) layer, 207 designates an upper electrode layer made of Pt, Au or the like, 208 designates a metal layer made of Al, Ag or the like, and 209 designates a hard mask layer made of silicon oxide or the like.

The mirror 1 is constructed by the monocrystalline silicon support layer 201 serving as a vibration plate, the metal layer 208 serving as a reflector and the hard mask layer 209.

The movable frame 2 as well as the torsion bars 3a and 3b is constructed by the monocrystalline silicon active layer 203 and the silicon oxide layer 204.

The inner piezoelectric actuators 4a-1, 4a-2, 4b-1 and 4b-2 and the outer piezoelectric actuators 6a-1 to 6a-4 and 6b-1 to 6b-4 and the piezoelectric sensors 7a and 7b are constructed by the monocrystalline silicon active layer 203, the silicon oxide layer 204, the lower electrode layer 205, the PZT layer 206 and the upper electrode layer 207.

The support body 5 is constructed by the monocrystalline silicon support layer 201, the intermediate silicon layer 202, the monocrystalline silicon active layer 203, the silicon oxide layer 204 and the hard mask layer 209.

The pads $P_{a1}$, $P_{a2}$, $P_{a3}$, $P_{a4}$, $P_{a5}$ and $P_{a6}$, $P_{b1}$, $P_{b2}$, $P_{b3}$, $P_{b4}$, $P_{b5}$ and $P_{b6}$ are constructed by the lower electrode layer 205.

First, an optical deflection or horizontal scanning operation by rocking the mirror 1 with respect to the X-axis is explained below.

That is, the drive voltage $V_{Xa}$ based upon the drive data Xa stored in advance in the nonvolatile memory 221 and the drive voltage $V_{Xb}$ based upon the drive data Xb stored in advance in the nonvolatile memory 222 are sinusoidal at a predetermined frequency such as 15 kHz and symmetrical or opposite in phase to each other and with the reference voltage $V_{Xr}$ based upon the reference data Xr stored in advance in the nonvolatile memory 223. As a result, the inner piezoelectric actuators 4a-1 and 4a-2 and the inner piezoelectric actuators 4b-1 and 4b-2 carry out flexing operations in opposite directions to each other, so that the torsion bars 3a and 3b are twisted to rock the mirror 1 with respect to the X-axis.

In the optical deflection or horizontal scanning operation by rocking the mirror 1 with respect to the X-axis, since the rising and falling timings of the drive voltage $V_{Xa}$ coincide with the falling and rising timings, respectively, of the drive voltage $V_{Xb}$, the drive voltage $V_{Xa}$ and $V_{Xb}$ can be said to be synchronous with each other.

Next, an optical deflection or vertical scanning operation by rocking the mirror 1 with respect to the Y-axis is explained below.

The outer piezoelectric actuators 6a-1, 6a-2, 6a-3, 6a-4, 6b-1, 6b-2, 6b-3 and 6b-4 are divided into an odd-numbered group of the outer piezoelectric actuators 6a-1 and 6a-3; 6b-1 and 6b-3, and an even-numbered group of the outer piezoelectric actuators 6a-2 and 6a-4; 6b-2 and 6b-4 alternating with the odd-numbered group of the outer piezoelectric actuators 6a-1 and 6a-3; 6b-1 and 6b-3.

Figure 3:
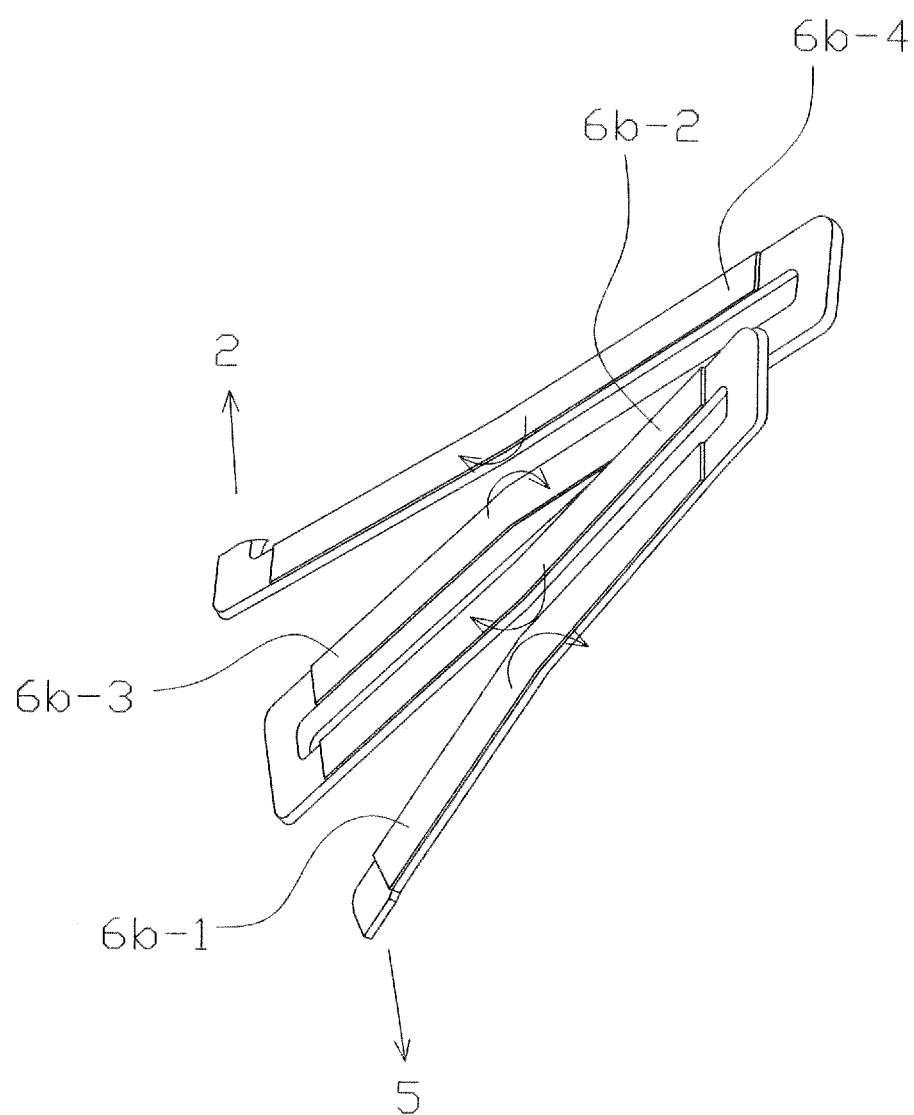
FIG. 3 is a diagram for explaining the operation of the outer piezoelectric actuators of FIG. 1.

As illustrated in FIG. 3 which illustrates only the outer piezoelectric actuators 6b-1, 6b-2, 6b-3 and 6b-4, when odd-numbered group of the outer piezoelectric actuators 6a-1, 6a-3, 6b-1 and 6b-3 are flexed in one direction, for example, in a downward direction, the even-numbered group of the outer piezoelectric actuators 6a-2, 6a-4, 6b-2 and 6b-4 are flexed in the other direction, i.e., in an upward direction. On the other hand, when the odd-numbered group of the outer piezoelectric actuators 6a-1, 6a-3, 6b-1 and 6b-3 are flexed in the upward direction, the even-numbered group of the outer piezoelectric actuators 6a-2, 6a-4, 6b-2 and 6b-4 are flexed in the downward direction. Thus, the mirror 1 is rocked.

Figure 4A:
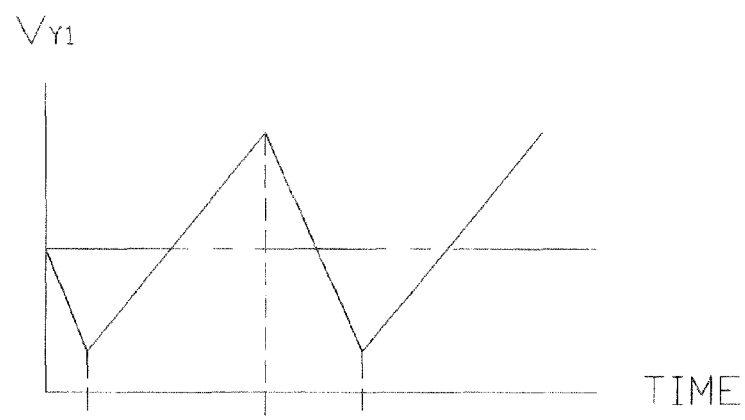
FIGS. 4A, 4B and 4C are timing diagrams for illustrating the drive voltages $V_{Y1}$, $V_{Y2}$ and the deflection angle A of FIG. 1 when the driver of FIG. 1 is applied to the prior art.
Figure 4B:
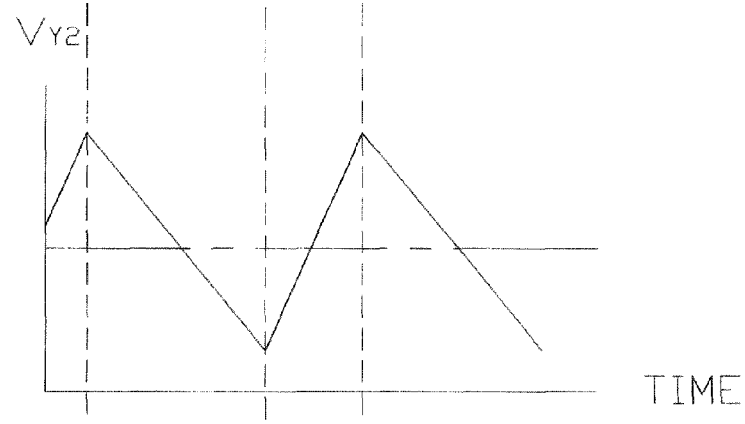
Figure 4C:
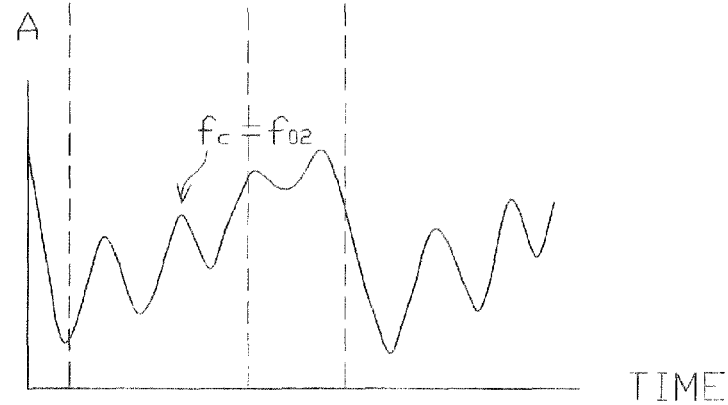

For example, assume that the drive voltage $V_{Y1}$ is saw-tooth-shaped as illustrated in FIG. 4A and the drive voltage $V_{Y2}$ is saw-tooth-shaped as illustrated in FIG. 4B. In this case, if a harmonic frequency component such as a first-order harmonic frequency component $f_1$ of the drive voltages $V_{Y1}$ and $V_{Y2}$ coincides with or be brought close to a natural frequency $f_c = f_{02}$ (see: FIG. 6) of a mechanically-vibrating system of the mirror 1 with respect to the Y-axis depending upon the outer piezoelectric actuators 6a-1, 6a-2, 6a-3, 6a-4, 6b-1, 6b-2, 6b-3 and 6b-4, the first-order frequency component $f_1$ would resonate with the natural frequency $f_c$, so that the natural frequency $f_c$ would appear in the deflection angle A of the mirror 1 as illustrated in FIG. 4C.

According to a first example of the presently disclosed subject matter, complex-sinusoidal-wave drive voltages each a combination of two different sinusoidal-wave voltages are used instead of the saw-tooth drive voltages $V_{Y1}$ and $V_{Y2}$ of FIGS. 4A and 4B.

Figure 5:
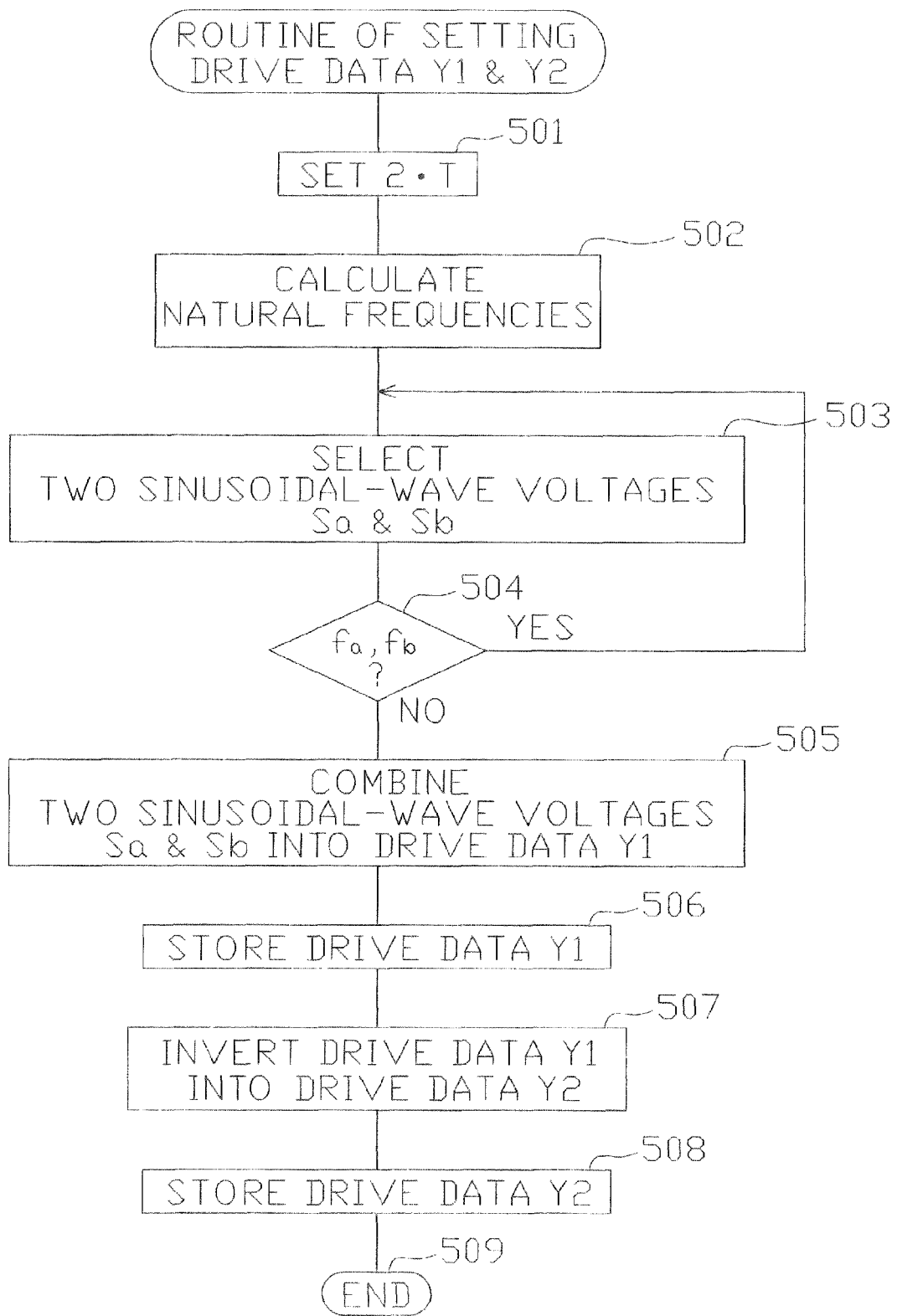
FIG. 5 is a flowchart for explaining a first example of setting the drive data of the outer piezoelectric actuators as an operation of the control circuit of FIG. 1.

FIG. 5 is a flowchart for explaining the first example of setting the drive data $V_{Y1}$ and $V_{Y2}$ of the outer piezoelectric actuators as an operation of the control circuit 21 of FIG. 1.

First, referring to step 501, a period 2·T of the drive voltages $V_{Y1}$ and $V_{Y2}$ is set in accordance with the customer's request and so on. For example, if the vertical deflection is carried out at a frequency of 60 Hz, $2 \cdot T \leftarrow 1/60$ where T is a half period.

Next, referring to step 502, the CPU of the control circuit 21 calculates natural frequencies $f_{01}$, $f_{02}$, ... of the mechanically-vibrating system of the mirror 1 with respect to the Y-axis depending upon the structure of the outer piezoelectric actuators 6a-1, 6a-2, 6a-3 and 6a-4, 6b-1, 6b-2, 6b-3 and 6b-4. For example, when the outer piezoelectric actuators 6a-1, 6a-2, 6a-3 and 6a-4, 6b-1, 6b-2, 6b-3 and 6b-4 are 30 μm thick, 35 mm long and 0.2 mm wide and their spring constant is $5.0 \times 10^{-3}$ N/cm$^2$, the frequency characteristics of the mirror 1 are illustrated in FIG. 6 where $f_{01}=102$ Hz and $f_{02}=205$ Hz are natural frequencies.

Next, referring to step 503, two sinusoidal-wave voltages $S_a$ and $S_b$ are selected by designating a ratio of T1a to T1b where T1a is a half period of the sinusoidal-wave voltage $S_a$, and T1b is a half period of the sinusoidal-wave voltage $S_b$. In this case, $T1a + T1b = T$ $T1a > T1b$ For example, $T1a : T1b = 6:4$ As a result, a sinusoidal-wave voltage $S_a$ as illustrated in FIG. 7A and a sinusoidal-wave voltage $S_b$ as illustrated in FIG. 7B are selected.

Next, referring to step 504, it is determined whether or not the frequencies $f_a$ and $f_b$ of the selected sinusoidal-wave voltages $S_a$ and $S_b$ are the same or close to, i.e., around the natural frequencies $f_{01}$, $f_{02}$, ... of the mechanically-vibrating system of the mirror 1 with respect to the Y-axis obtained at step 502. In this case, $f_a = 1/(2 \cdot T1a)$ $f_b = 1/(2 \cdot T1b)$ For example, when T1a:T1b=6:4, $f_a$=50 Hz $f_b$=75 Hz Therefore, fa=50 Hz and fb=75 Hz are smaller than the natural frequencies $f_{01}$=102 Hz and $f_{02}$=205 Hz, so that the frequencies $f_a$ and $f_b$ of the selected sinusoidal-wave voltages $S_a$ and $S_b$ are far away from the natural frequencies $f_{01}$ and $f_{02}$. In this case, the control proceeds from step 504 to step 505. Note that, if the frequencies $f_a$ and $f_b$ of the selected sinusoidal-wave voltages $S_a$ and $S_b$ are the same or close to the natural frequencies $f_{01}$ and $f_{02}$, the control returns to step 503 which again selects two sinusoidal-wave voltages $S_a$ and $S_b$ by changing the ratio of T1a to T1b.

At step 505, a rising period of the sinusoidal-wave voltage $S_a$ as illustrated in FIG. 7A and a falling period of the sinusoidal-wave voltage $S_b$ as illustrated in FIG. 7B are continuously combined into a T1a:T1b sinusoidal-wave drive voltage $V_{Y1}$, i.e., a complex-sinusoidal-wave drive voltage $V_{Y1}$ as illustrated in FIG. 8. That is, an end point of the rising period of the sinusoidal-wave voltage $S_a$ coincides with a start point of the falling period of the sinusoidal-wave voltage $S_b$ and an end point of the falling period of the sinusoidal-wave voltage $S_b$ coincides with a start point of the rising period of the sinusoidal-wave voltage $S_a$.

Next, referring to step 506, drive data Y1 for the drive voltage $V_{X1}$ is stored in the nonvolatile memory 224.

Figure 9A:
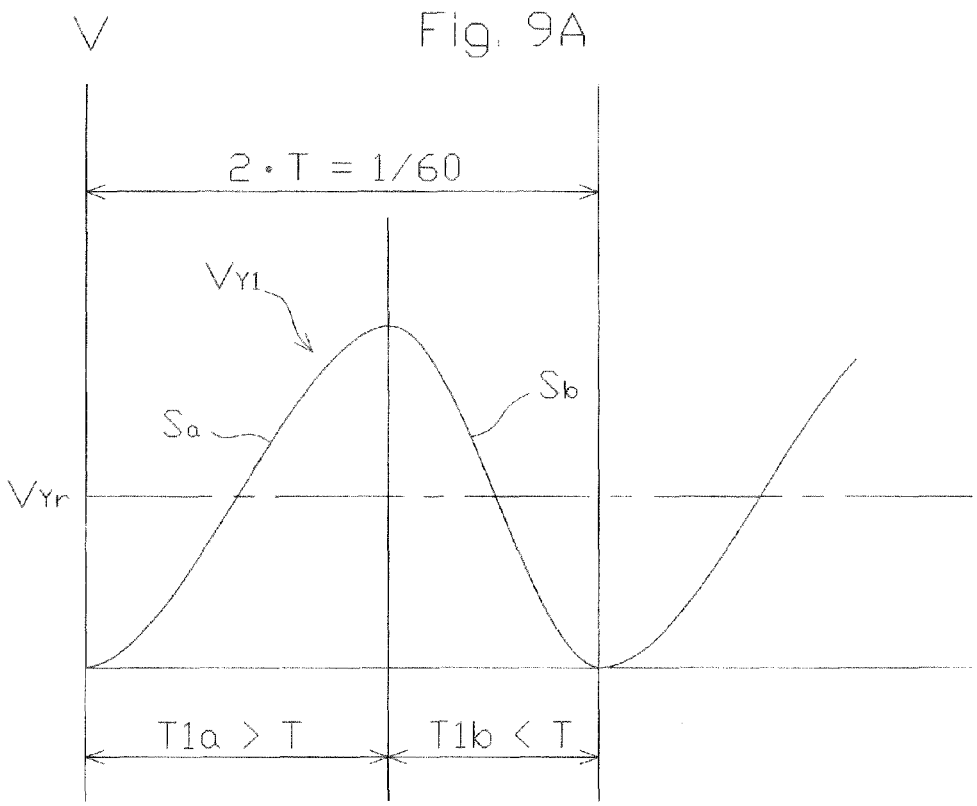
FIGS. 9A and 9B are timing diagrams for explaining inversion of the drive voltage $V_{Y1}$ into the drive voltage $V_{Y2}$ at step 507 of FIG. 5.
Figure 9B:
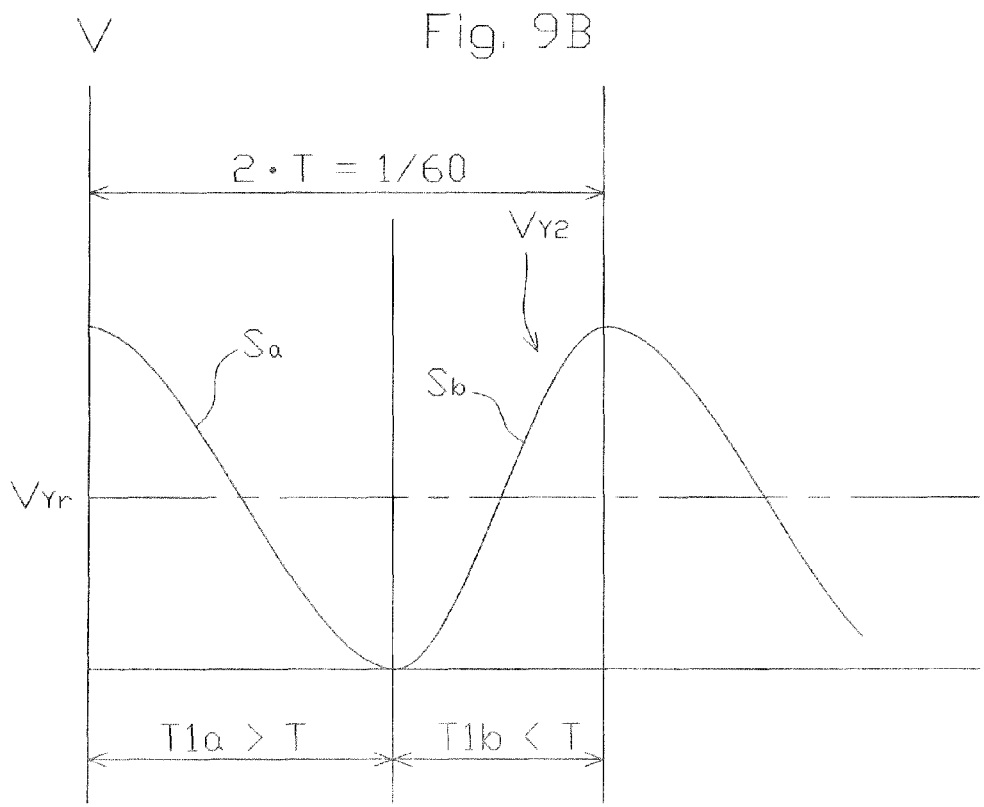

Next, referring to step 507, the drive data Y1 is inverted with respect to reference data Yr into drive data Y2. That is, the drive voltage $V_{Y1}$ as illustrated in FIG. 9A which corresponds to FIG. 8 is inverted with respect to reference voltage $V_{Yr}$ into a T1b:T1a sinusoidal-wave drive voltage $V_{Y2}$, i.e., a complex-sinusoidal-wave drive voltage $V_{Y2}$ as illustrated in FIG. 9B. That is, an end point of the falling period of the sinusoidal-wave voltage $S_a$ coincides with a start point of the rising period of the sinusoidal-wave voltage $S_b$, and an end point of the rising period of the sinusoidal-wave voltage $S_b$ coincides with a start point of the falling period of the sinusoidal-wave voltage $S_a$. Thus, the drive voltage $V_{Y2}$ is synchronous with the drive voltage $V_{Y1}$.

Next, referring to step 508, drive data Y2 for the drive voltage $V_{Y2}$ is stored in the nonvolatile memory 225.

Then, the routine of FIG. 5 is completed by step 509.

Figure 10:
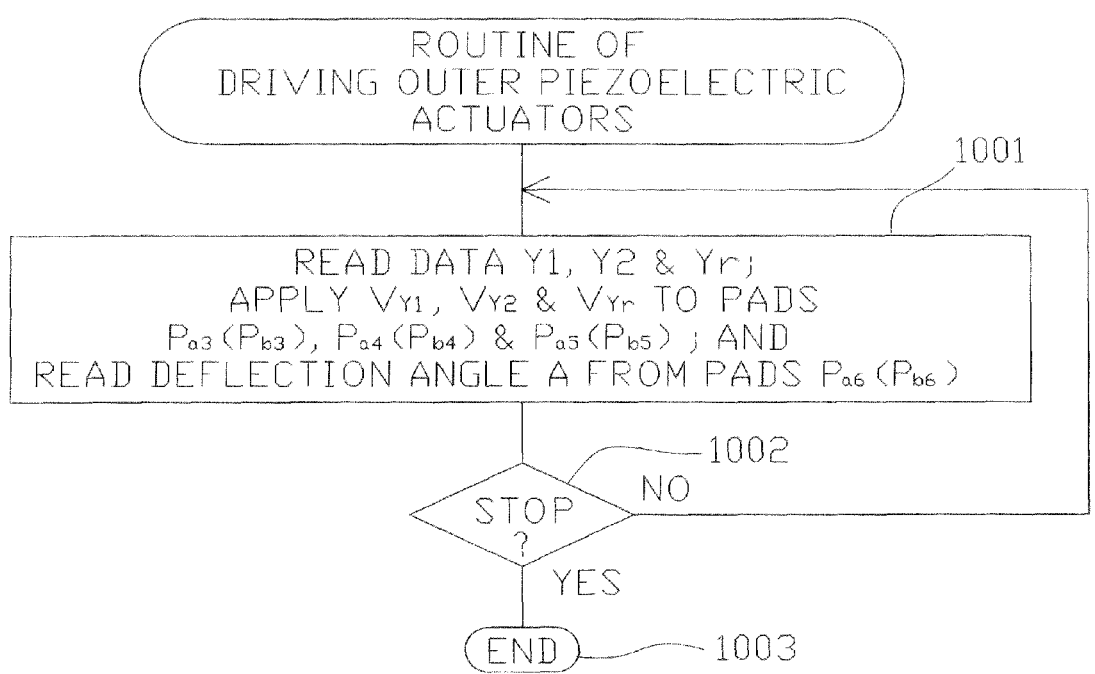
FIG. 10 is a flowchart for explaining of driving the outer piezoelectric actuators as an operation of the control circuit of FIG. 1.

FIG. 10 is a flowchart for explaining driving of the outer piezoelectric actuators as an operation of the control circuit 21 of FIG. 1 in accordance with the drive data Y1, Y2 and Yr stored in the nonvolatile memories 224, 225 and 226 by the routine of FIG. 5.

Figure 11A:
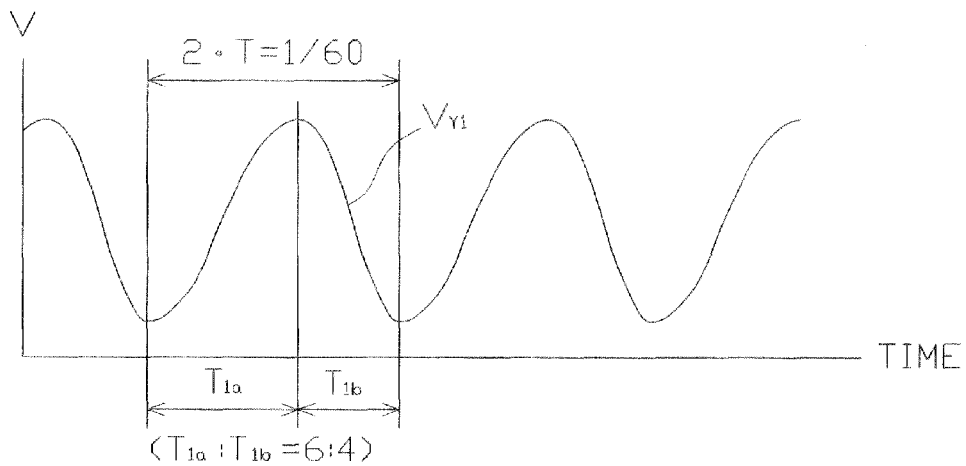
FIGS. 11A, 11B and 11C are timing diagrams of the drive voltages $V_{Y1}$ and $V_{Y2}$ and the deflection angle A in the flowchart of FIG. 10.
Figure 11B:
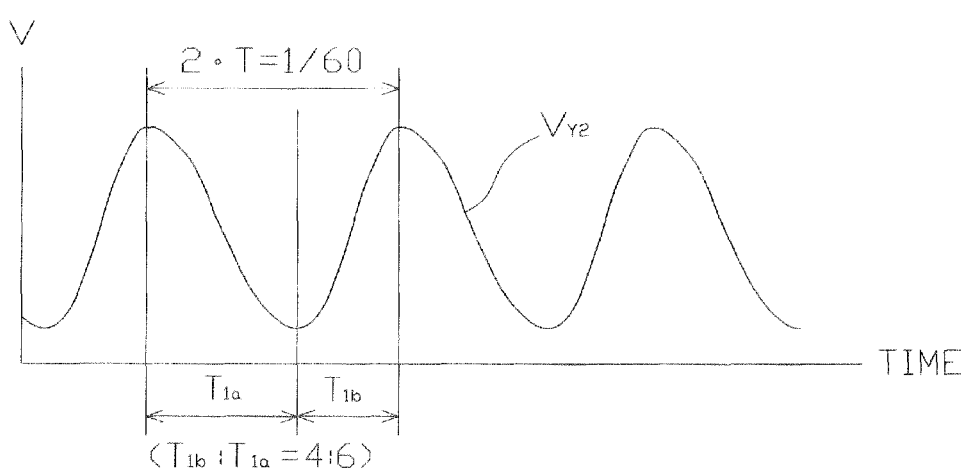
Figure 11C:
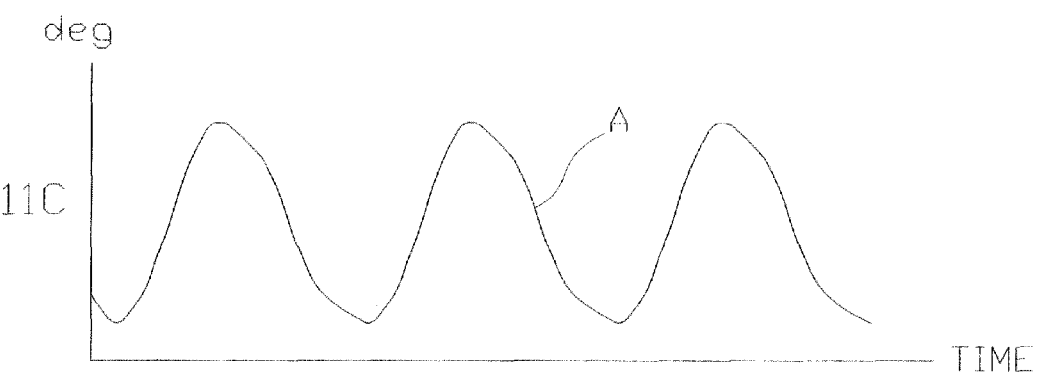

Referring to step 1001, the drive data Y1 and Y2 are sequentially readout of the nonvolatile memories 224 and 225, so that the drive voltage $V_{Y1}$ as illustrated in FIG. 11A is applied to the odd-numbered group of the outer piezoelectric actuators 6a-1, 6a-3, 6b-1 and 6b-3, and the drive voltage $V_{Y2}$ as illustrated in FIG. 11B is applied to the even-numbered group of the outer piezoelectric actuators 6a-2, 6a-4, 6b-2 and 6b-4. Simultaneously, a deflection angle A of the mirror 1 as illustrated in FIG. 11C is read from the pads $P_{a6}$ and $P_{b6}$. In this case, note that the deflection angle A includes no natural frequency components.

Then, step 1001 of FIG. 10 is repeated by step 1002 until a stop message is input or generated.

At step 1001, note that the drive voltage $V_{Y1}$ as illustrated in FIG. 11A can be applied to the even-numbered group of the outer piezoelectric actuators 6a-2, 6a-4, 6b-2 and 6b-4, and the drive voltage $V_{Y2}$ as illustrated in FIG. 11B can be applied to the odd-numbered group of the outer piezoelectric actuators 6a-1, 6a-3, 6b-1 and 6b-3.

Figure 12A:
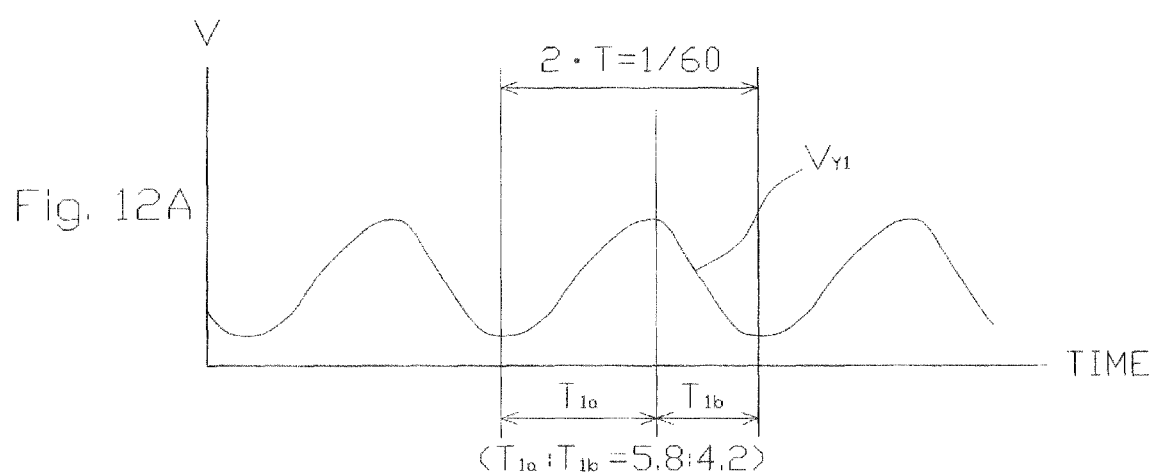
FIGS. 12A, 12B and 12C are other timing diagrams of the drive voltages $V_{Y1}$ and $V_{Y2}$ and the deflection angle A in the flowchart of FIG. 10.
Figure 12B:
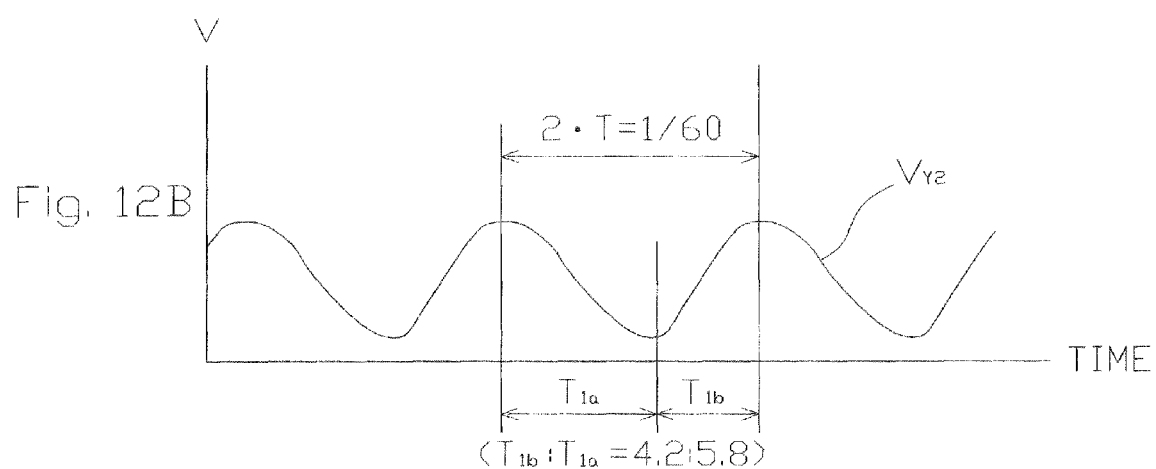
Figure 12C:
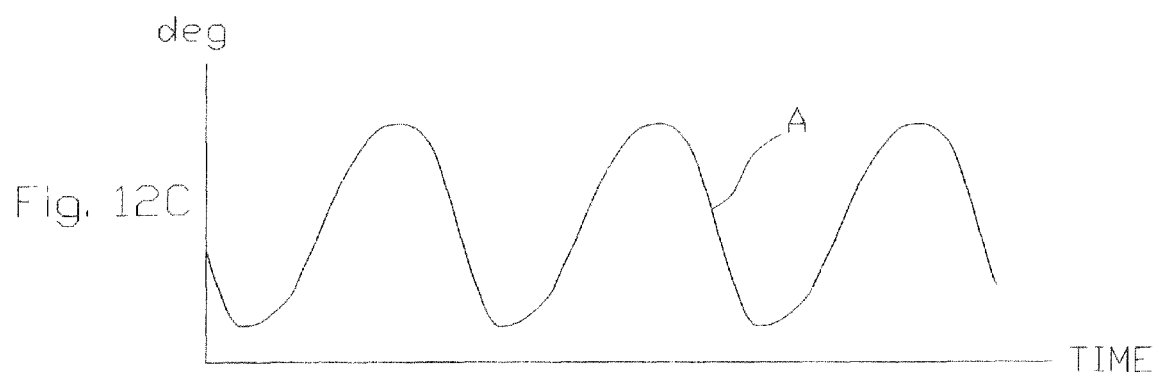

In the above-mentioned first example, T1a:T1b=6:4. However, the ratio of T1a to T1b can be other values. For example, T1a:T1b=5.8:4.2. In this case, $f_a$=51.7 Hz $f_b$=71.4 Hz Therefore, even in this case, $f_a$=51.7 Hz and $f_b$=71.4 Hz are smaller than the natural frequencies $f_{01}$=102 Hz and $f_{02}$=205 Hz, the frequencies $f_a$ and $f_b$ of the selected sinusoidal-wave voltages $S_a$ and $S_b$ are far away from the natural frequencies $f_{01}$ and $f_{02}$ as illustrated in FIG. 7. As a result, a drive voltage $V_{Y1}$ as illustrated in FIG. 12A is obtained and a drive voltage $V_{Y2}$ as illustrated in FIG. 12B is obtained, so that a deflection angle A of the mirror 1 as illustrated in FIG. 12C including no natural frequency components is obtained.

However, the ratio T1a/(T1a+T1b) or T1b/(T1a+T1b) should be within 0.2 to 0.8. If the ratio T1a/(T1a+T1b) or T1b/(T1a+T1b) is smaller than 0.2 or larger than 0.8, the sinusoidal-wave voltage $S_a$ or $S_b$ defined by the smaller one of T1a and T1b is close to a straight line which increases its harmonic components in the drive voltages $V_{Y1}$ and $V_{Y2}$ corresponding to the natural frequencies of the mirror 1 with respect to the Y-axis.

Further, in the first example, the amplitude of the drive voltage $V_{Y1}$ may be the same as that of the drive voltage $V_{Y2}$ or different from that of the drive voltage $V_{Y2}$.

According to a second example of the presently disclosed subject matter, complex-sinusoidal-wave drive voltages each formed by two pseudo sinusoidal-wave voltages are used instead of the saw-tooth drive voltages $V_{Y1}$ and $V_{Y2}$ of FIGS. 4A and 4B.

Figure 13:
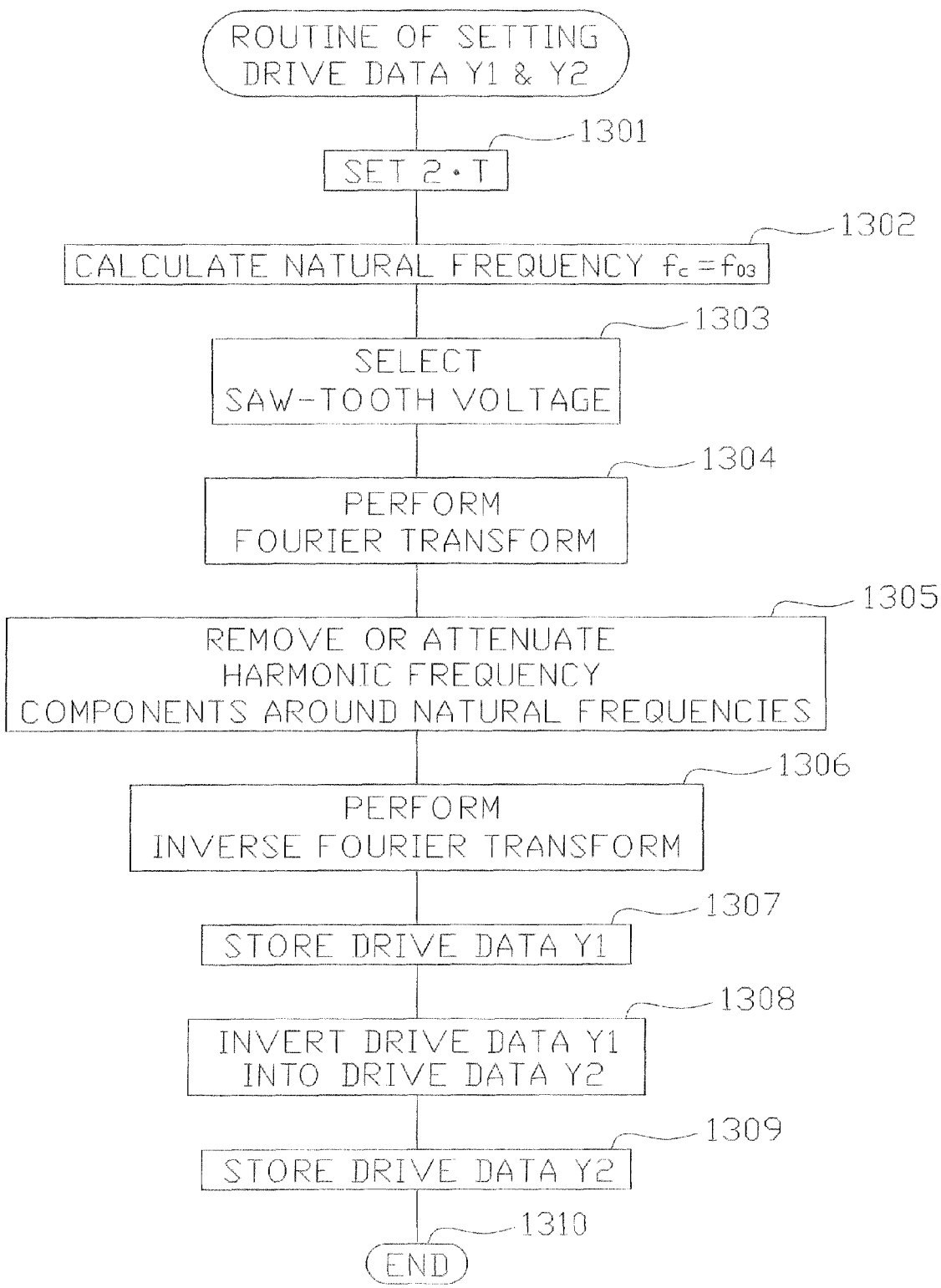
FIG. 13 is a flowchart for explaining a second example of setting the drive data of the outer piezoelectric actuators as an operation of the control circuit of FIG. 1.

FIG. 13 is a flowchart for explaining the second example of setting the drive data $V_{Y1}$ and $V_{Y2}$ of the outer piezoelectric actuators as an operation of the control circuit 21 of FIG. 1.

First, referring to step 1301, a period 2·T of the drive voltages $V_{Y1}$ and $V_{Y2}$ is set in accordance with the customer's request and so on. For example, if the vertical deflection is carried out at a frequency of 60 Hz, $2 \cdot T \leftarrow 1/60$ where T is a half period.

Figure 14:
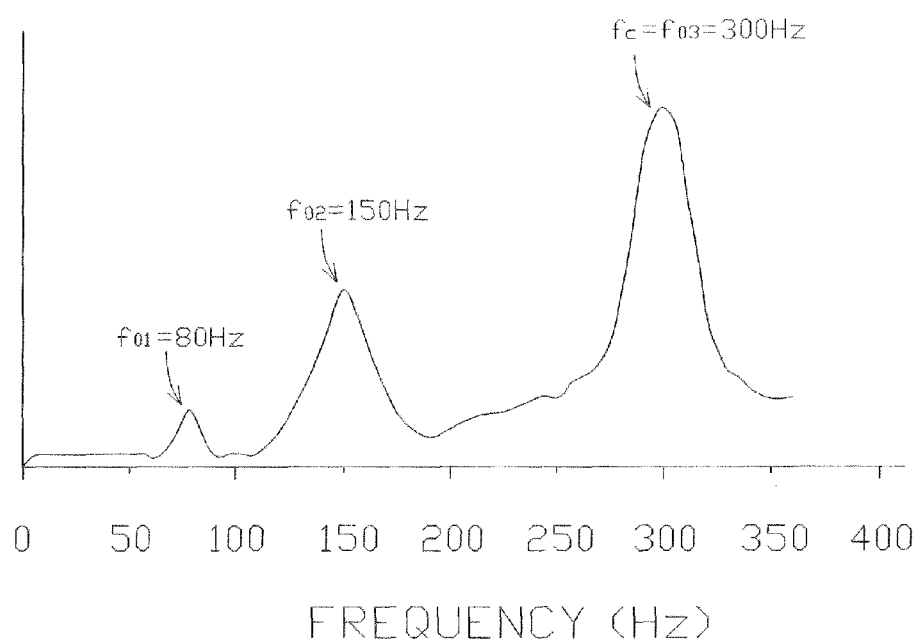
FIG. 14 is a frequency spectrum diagram of the mechanically-vibrating system of the mirror of FIG. 1 calculated at step 1302 of FIG. 13.

Next, referring to step 1302, the CPU of the control circuit 21 calculates natural frequencies $f_{01}$, $f_{02}$, $f_{03}$, ... of the mechanically-vibrating system of the mirror 1 depending upon the structure of the outer piezoelectric actuators 6a-1, 6a-2, 6a-3 and 6a-4, 6b-1, 6b-2, 6b-3 and 6b-4. For example, when the outer piezoelectric actuators 6a-1, 6a-2, 6a-3 and 6a-4, 6b-1, 6b-2, 6b-3 and 6b-4 are 40 µm thick, 35 mm long and 0.2 mm wide and their spring constant is $1.0 \times 10^{-3}$ N/cm$^2$, the frequency characteristics of the mirror 1 are illustrated in FIG. 14 where $f_{01}$=80 Hz, $f_{02}$=150 Hz, $f_{03}$=300 Hz, ....

Figure 15:
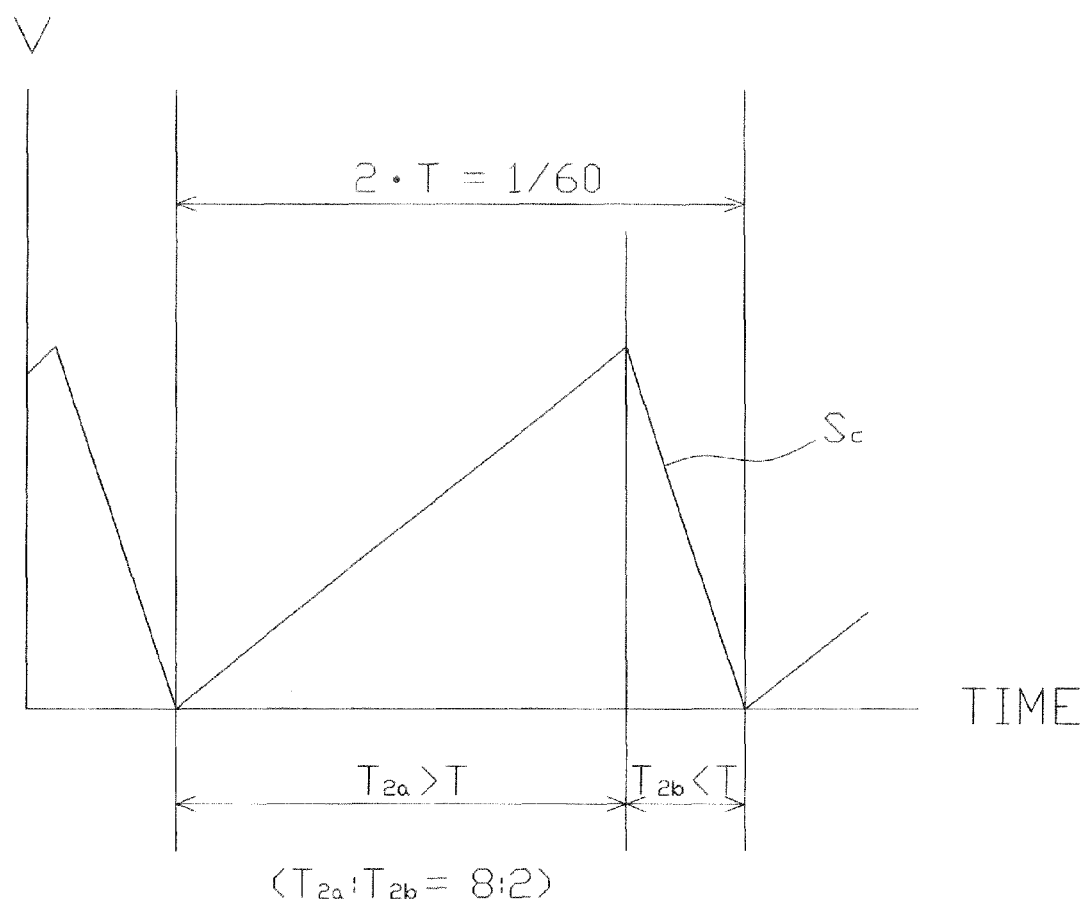
FIG. 15 is a timing diagram of the saw-tooth voltage selected at step 1303 of FIG. 13.

Next, referring to step 1303, a saw-tooth voltage $S_c$ is selected by designating a ratio of T2a to T2b. In this case, $T2a + T2b = T$ $T2a > T2b$ For example, $T2a:T2b = 8:2$ As a result, a saw-tooth voltage $S_c$ as illustrated in FIG. 15 is obtained.

Figure 16:
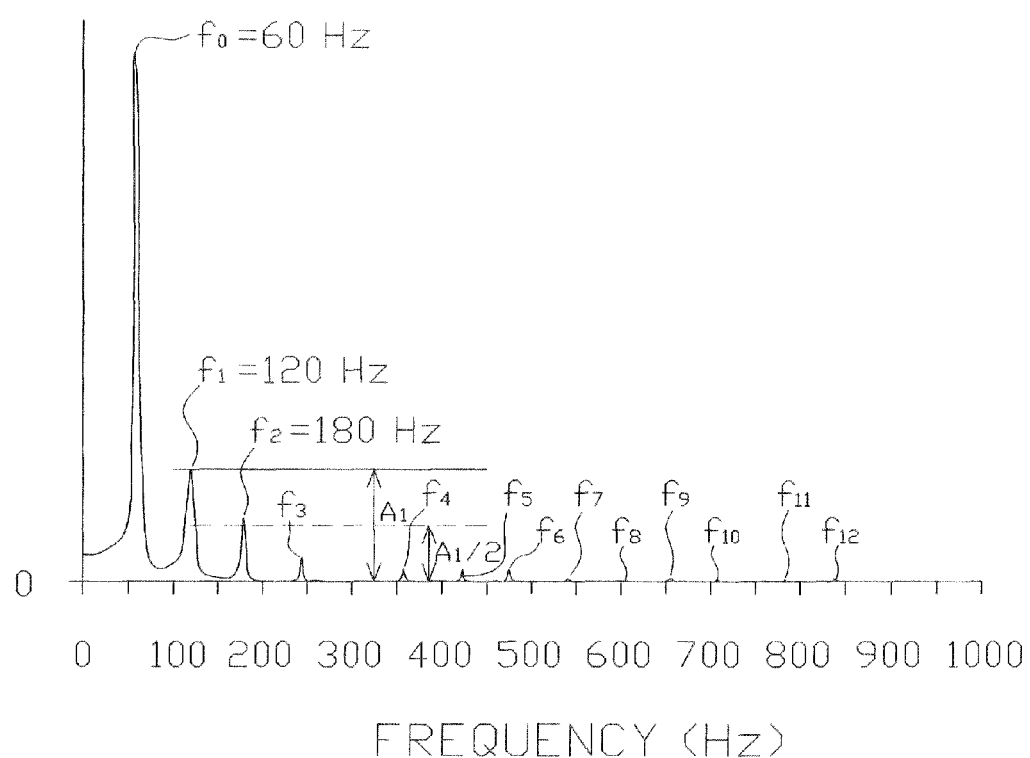
FIG. 16 is a frequency spectrum diagram obtained by the Fourier transform at step 1304 of FIG. 13.

Next, referring to step 1304, the CPU of the control circuit 21 performs a Fourier transform upon the selected saw-tooth voltage $S_c$ to obtain a frequency spectrum as illustrated in FIG. 16 where $f_0$ is a fundamental frequency (=60 Hz), $f_1$ is a first-order harmonic frequency (=120 Hz), $f_2$ is a second-order harmonic frequency (=180 Hz), ....

In the frequency spectrum as illustrated in FIG. 16, the harmonic frequencies $f_1, f_2, \ldots$ may coincide with the natural frequencies $f_{01}, f_{02}, \ldots$ of the mechanically-vibrating system of the mirror 1. In this case, if the harmonic frequency components falling within about 80 to 300 Hz are removed from the selected saw-tooth voltage $S_c$ or the amplitudes of such harmonic frequency components are attenuated, the selected saw-tooth voltage $S_c$ would not resonate with the natural frequencies $f_{01}, f_{02}, \ldots$. Therefore, the harmonic frequency components $f_1, f_2,$ and $f_3$ should be removed or attenuated.

Next, referring to step 1305, the CPU of the control circuit 21 determines which harmonic frequency components are around the natural frequencies $f_{01}, f_{02}, f_{03}, \ldots$ of the mechanically-vibrating system of the mirror 1. Then, the CPU of the control circuit 21 removes or attenuates the harmonic frequency components around the natural frequencies $f_{01}, f_{02}, f_{03}, \ldots$. In more detail, the CPU of the control circuit 21 selects one of the harmonic frequency components having a largest amplitude $A_i$ and selects the other harmonic frequency components having larger amplitudes than $A_i/\alpha$ where $\alpha$ is larger than 1 ($\alpha>1$). Then, the largest amplitude $A_i$ and the above-mentioned other amplitudes are removed or attenuated to Ai/2.

Figure 17A:
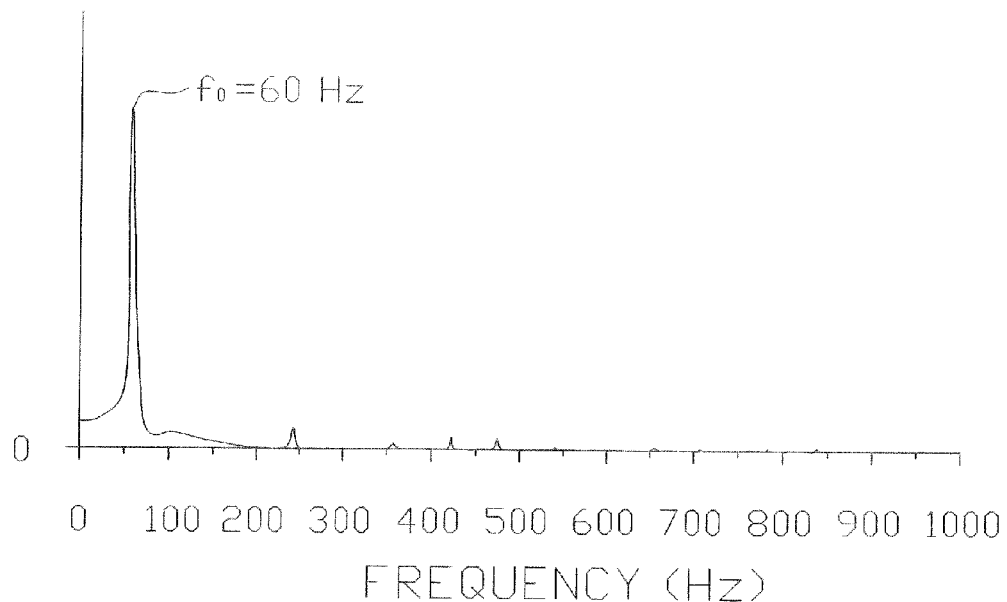
FIGS. 17A and 17B are frequency spectrum diagrams obtained at step 1305 of FIG. 13.
Figure 17B:
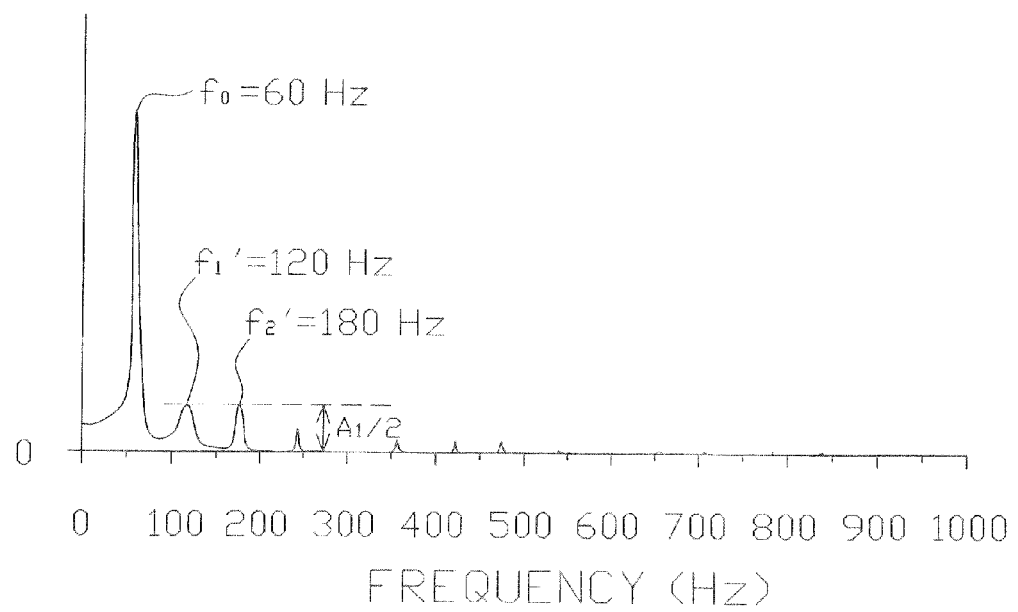

Actually, at step 1305, if $\alpha=2$, the first-order harmonic frequency component $f_1$ and other harmonic frequency components with amplitudes larger than half of the amplitude $A_1$ of the first-order harmonic frequency component $f_1$ are removed as illustrated in FIG. 17A or their amplitudes are attenuated to $A_1/2$ as illustrated in FIG. 17B.

Figure 18A:
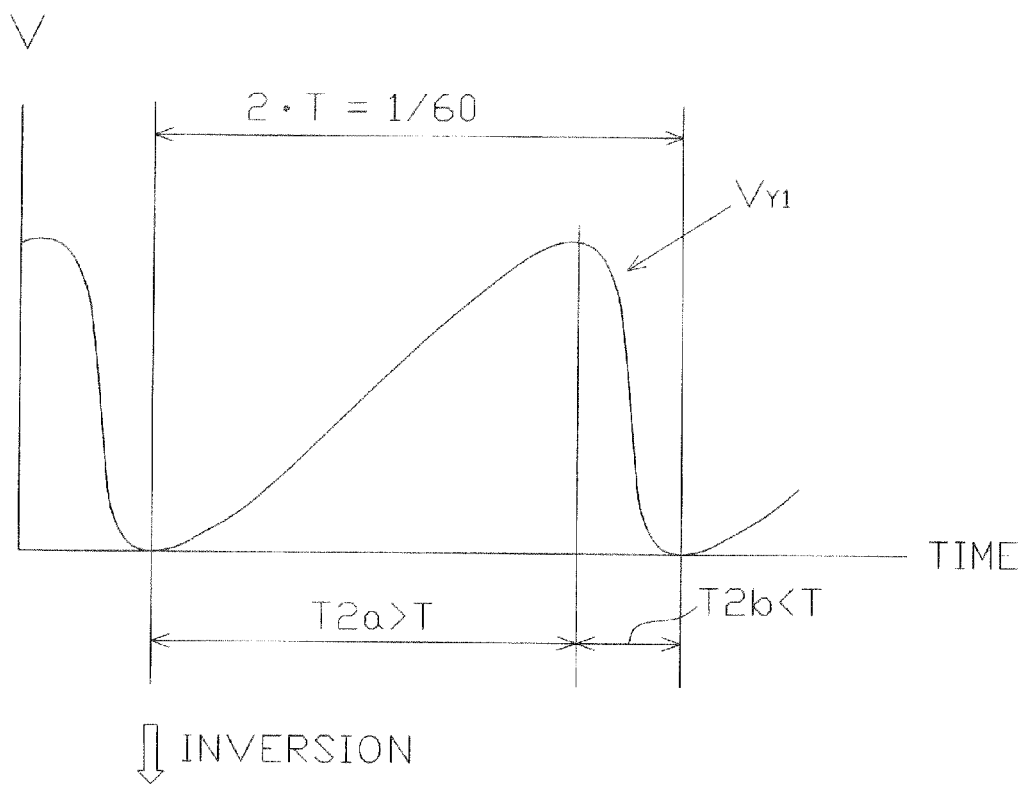
FIGS. 18A and 18B are timing diagrams for explaining inversion of the drive voltage $V_{Y1}$ into the drive voltage $V_{Y2}$ at step 1308 of FIG. 13.

Next, referring to step 1306, the CPU of the control circuit 21 performs an inverse-Fourier transform upon the frequency spectrum of FIG. 17A or 17B to obtain a complex-sinusoidal-wave drive voltage $V_{y1}$ as illustrated in FIG. 18A. That is, the drive voltage $V_{y1}$ of FIG. 18A is a rounded wave of the saw-tooth voltage of FIG. 14, so that the drive voltage $V_{y1}$ of FIG. 18A is similar to that of FIG. 9A. Also, a rising period of the drive voltage $V_{y1}$ is approximately the same as the period $T2a$ of the saw-tooth voltage $S_c$ of FIG. 14, and a falling period of the drive voltage $V_{y1}$ is approximately the same as the period $T2b$ of the saw-tooth voltage $S_c$ of FIG. 15. Thus, it can be said that a rising period $T2a$ of a pseudo sinusoidal-wave and a falling period $T2b$ of another pseudo sinusoidal-wave are continuously combined into the drive voltage $V_{y1}$. Therefore, it can be said that a $T2a:T2b$ sinusoidal-wave drive voltage, i.e., a complex-sinusoidal-wave drive voltage $V_{y1}$ is obtained.

Next, referring to step 1307, drive data Y1 for the drive voltage $V_{X1}$ is stored in the nonvolatile memory 224.

Figure 18B:
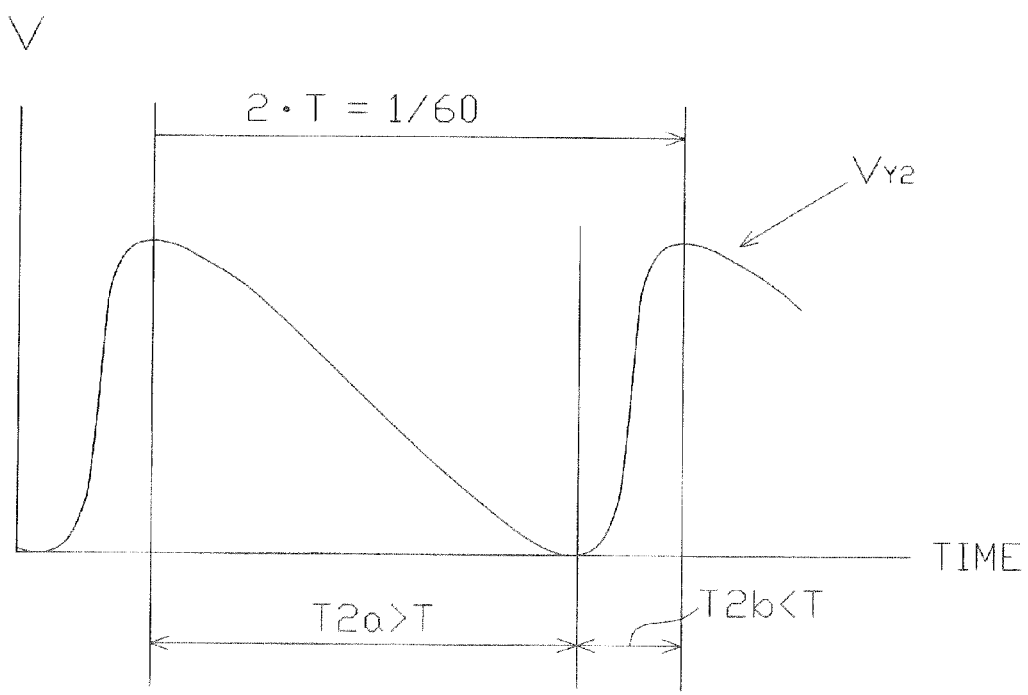

Next, referring to step 1308, the drive data Y1 is inverted with respect to reference data Yr into drive data Y2. That is, the drive voltage $V_{y1}$ as illustrated in FIG. 18A is inverted with respect to reference voltage $V_{yr}$ into a $T2b:T2a$ sinusoidal-wave drive voltage $V_{y2}$, i.e., a complex-sinusoidal-wave drive voltage $V_{y2}$ as illustrated in FIG. 18B. Thus, the drive voltage $V_{y2}$ is synchronous with the drive voltage $V_{y1}$.

Next, referring to step 1309, drive data Y2 for the drive voltage $V_{y2}$ is stored in the nonvolatile memory 225.

Then, the routine of FIG. 13 is completed by step 1310.

At step 1305 and 1306, the drive voltage $V_{y1}$ can be formed by subtracting sinusoidal-wave voltages of the frequencies $f_1$ and $f_2$ which should be removed from the saw-tooth voltage $V_C$.

At step 1308, first, the saw-tooth voltage $S_C$ can be inverted with respect to the reference data $V_{yr}$ into a saw-tooth voltage $S_C'$ and then, the drive voltage $V_{y2}$ can be obtained by subtracting sinusoidal-wave voltages of the frequencies $f_1$ and $f_2$ which should be removed from the saw-tooth voltage $V_C$.

Figure 19:
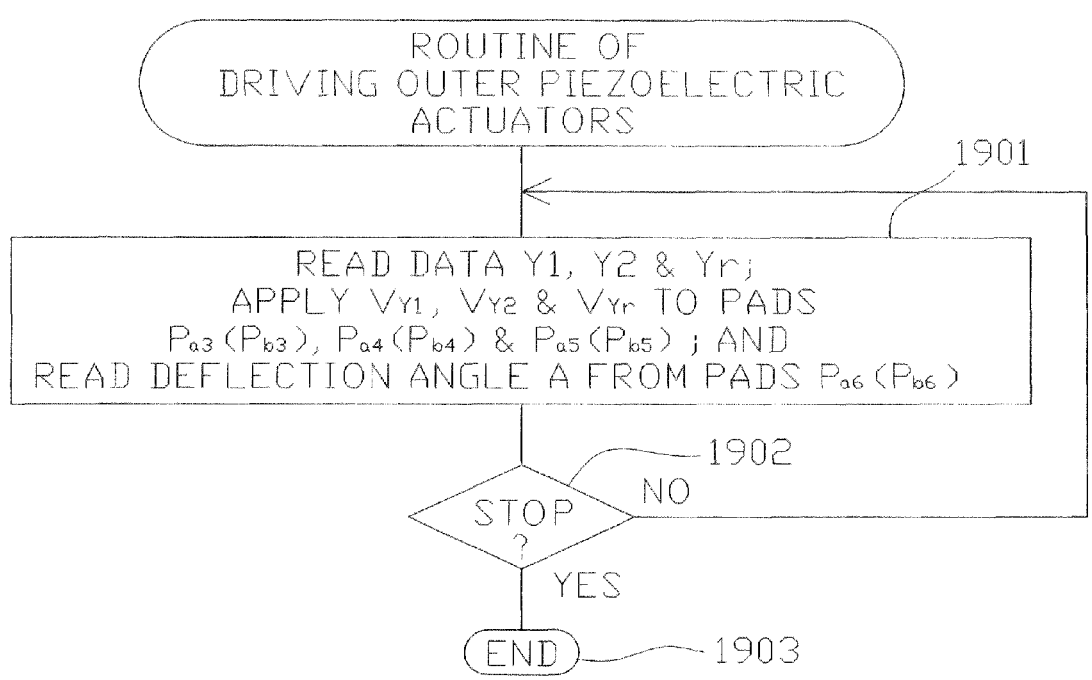
FIG. 19 is a flowchart for explaining of driving of the outer piezoelectric actuators as an operation of the control circuit of FIG. 1.

FIG. 19 is a flowchart for explaining driving of the outer piezoelectric actuators as an operation of the control circuit 21 of FIG. 1 in accordance with the drive data Y1, Y2 and Yr stored in the nonvolatile memories 224, 225 and 226 by the routine of FIG. 13.

Referring to step 1901, the drive data Y1 and Y2 are sequentially readout of the nonvolatile memories 224 and 225, so that the drive voltage $V_{y1}$ as illustrated in FIG. 20A is applied to the odd-numbered group of the outer piezoelectric actuators 6a-1, 6a-3, 6b-1 and 6b-3, and the drive voltage $V_{y2}$ as illustrated in FIG. 20B is applied to the even-numbered group of the outer piezoelectric actuators 6a-2, 6a-4, 6b-2 and 6b-4. Thus, a deflection angle A of the mirror 1 as illustrated in FIG. 20C is read from the pads $P_{a6}$ and $P_{b6}$. Note that the deflection angle A includes no natural frequency components.

Then, step 1901 of FIG. 19 is repeated by step 1902 until a stop message is input or generated.

At step 1901, note that the drive voltage $V_{y1}$ as illustrated in FIG. 20A can be applied to the even-numbered group of the outer piezoelectric actuators 6a-2, 6a-4, 6b-2 and 6b-4, and the drive voltage $V_{y2}$ as illustrated in FIG. 20B can be applied to the odd-numbered group of the outer piezoelectric actuators 6a-1, 6a-3, 6b-1 and 6b-3.

In the above-mentioned second example, $T2a:T2b=8:2$. However, the ratio of $T2a$ to $T2b$ can be other values.

Also, in the second example, the amplitude of the drive voltage $V_{y1}$ may be the same as that of the drive voltage $V_{y2}$ or different from that of the drive voltage $V_{y2}$.

According to the above-described embodiments, since the rising period (or falling period) of the drive voltage $V_{y1}$ and the falling period (or rising period) of the drive voltage $V_{y2}$ are larger than the falling period (or rising period) of the drive voltage $V_{y1}$ and the rising period (or falling period) of the drive voltage $V_{y2}$, the deflection angle can be linearly changed for a longer period so that the optical deflector according to the presently disclosed subject matter can be applied to an image display apparatus such as a projector.

Also, according to the above-described embodiments, the resonation of the harmonic frequency components of the drive voltage $V_{y1}$ and $V_{y2}$ with the natural frequency components of the mechanically-vibrating system of the mirror 1 can be suppressed.

Further, the routines of FIGS. 5, 10, 13 and 19 are stored as programs in the ROM or the like of the control circuit 21.

Furthermore, when the two-dimensional optical deflector of FIG. 1 has the same inner piezoelectric actuators without the torsion bars as the outer piezoelectric actuators, the presently disclosed subject matter can also be applied to such an optical deflector.

Further, the presently disclosed subject matter can be applied to a one-dimensional optical deflector which is constructed by a mirror; a movable body for supporting the mirror; a support body surrounding the movable frame; and piezoelectric actuators fixed between the support body and the movable frame and serving as cantilevers for rocking the mirror through the movable frame with respect to an axis of the mirror. In this case, the movable body may be a movable frame.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A driver for driving an optical deflector comprising:
a mirror;
a movable frame for supporting said mirror;
a support body surrounding said movable frame; and
a first group of piezoelectric actuators serving as cantilevers and a second group of piezoelectric actuators serving as cantilevers alternating with said first group of piezoelectric actuators,
said piezoelectric actuators being folded at every actuator and connected from said support body to said movable frame, each of said piezoelectric actuators being in parallel with one axis of said mirror,
said driver generating a first drive voltage having first repeated waves each with a first rising period and a first falling period, one of said first rising period and said first falling period being larger than the other, and applying said first drive voltage to said first group of piezoelectric actuators,
said driver generating a second drive voltage having second repeated waves each with a second falling period corresponding to said first rising period of said first drive voltage and a second rising period corresponding to said first falling period of said first drive voltage so that said second drive voltage is opposite in phase with said first drive voltage, and applying said second drive voltage to said second group of piezoelectric actuators,
wherein frequencies of said first and second repeated waves exclude natural frequencies of a mechanically-vibrating system of said mirror with respect to said axis thereof depending upon said piezoelectric actuators.

2. The driver as set forth in claim 1, wherein each of said first repeated waves is formed by combining a first sinusoidal-wave for said first rising period with a second sinusoidal-wave for said first falling period, and each of said second repeated waves is formed by combining said first sinusoidal-wave for said second falling period with said second sinusoidal-wave for said second rising period,
a frequency of said first sinusoidal-wave being different from a frequency of said second sinusoidal-wave,
an end point of said first sinusoidal-wave for said first rising period coinciding with a start point of said second sinusoidal-wave for said first falling period,
an end point of said second sinusoidal-wave for said first falling period coinciding with a start point of said first sinusoidal-wave for said first rising period,
an end point of said first sinusoidal-wave for said second falling period coinciding with a start point of said second sinusoidal-wave for said second rising period,
an end point of said second sinusoidal-wave for said second rising period coinciding with a start point of said first sinusoidal-wave for said second falling period.

3. The driver as set forth in claim 2, wherein a ratio of said first rising period to said first rising period plus said first falling period is 0.2 to 0.8.

4. A method for setting drive data for driving an optical deflector comprising:
a mirror;
a movable frame for supporting said mirror;
a support body surrounding said movable frame; and
a first group of piezoelectric actuators serving as cantilevers and a second group of piezoelectric actuators serving as cantilevers alternating with said first group of piezoelectric actuators,
said piezoelectric actuators being folded at every actuator and connected from said support body to said movable frame, each of said piezoelectric actuators being in parallel with one axis of said mirror,
said method comprising:
setting a period common to first and second drive voltages for said first and second groups of piezoelectric actuators, respectively;
designating first and second half periods, a total of said first and second half periods being equal to said period to select first and second sinusoidal-waves having first and second half periods, respectively;
determining whether or not frequencies of said first and second sinusoidal-waves are around natural frequencies of a mechanically-vibrating system of said mirror depending upon a structure of said piezoelectric actuators;
combining said first sinusoidal-wave with said second sinusoidal-wave to set first drive data for said first group of piezoelectric actuators in such a way that an end point of a rising period of said first sinusoidal-wave coincides with a start point of a falling period of said second sinusoidal-wave and an end point of the falling period of said second sinusoidal-wave coincides with a start point of the rising period of said first sinusoidal-wave, when the frequencies of said first and second sinusoidal-waves are not around said natural frequencies; and
inverting said first drive data into second drive data for said second group of piezoelectric actuators.

5. The method as set forth in claim 4, wherein a ratio of said first half period to said first half period plus said second half period is 0.2 to 0.8.

6. A method for setting drive data for driving an optical deflector comprising:
a mirror;
a movable frame for supporting said mirror;
a support body surrounding said movable frame; and
a first group of piezoelectric actuators serving as cantilevers and a second group of piezoelectric actuators serving as cantilevers alternating with said first group of piezoelectric actuators,
said piezoelectric actuators being folded at every actuator and connected from said support body to said movable frame, each of said piezoelectric actuators being in parallel with one axis of said mirror,
said method comprising:
setting a period common to first and second drive voltages for said first and second groups of piezoelectric actuators, respectively;
designating a rising period and a falling period, a total of said rising period and said falling period being the same as said period to select a saw-tooth wave data having said rising period and said falling period;
performing a Fourier transform upon said saw-tooth wave data to obtain a frequency spectrum;
removing or attenuating harmonic frequency components of said frequency spectrum around natural frequencies of a mechanically-vibrating system of said mirror depending upon said piezoelectric actuators;
performing an inverse-Fourier transform upon said frequency spectrum to obtain a first drive data for said first group of piezoelectric actuators after said harmonic frequency components are removed or attenuated; and
inverting said first drive data into second drive data for said second group of piezoelectric actuators.

7. The method as set forth in claim 6, wherein said removing or attenuating comprises:

selecting one of said harmonic frequency components having a largest amplitude $A_i$;

selecting other harmonic frequency components having amplitudes larger than $A_i/\alpha$ where $\alpha$ is larger than 1; and removing or attenuating said one of said harmonic frequency components and said other harmonic frequency components in said frequency spectrum.

\* \* \* \* \*